United States Patent
Morishima et al.

(10) Patent No.: US 7,311,950 B2
(45) Date of Patent: Dec. 25, 2007

(54) COMPOSITION, OPTICAL COMPENSATORY FILM AND LIQUID CRYSTAL DISPLAY

(75) Inventors: Shinichi Morishima, Minami-ashigara (JP); Shigeaki Nimura, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 242 days.

(21) Appl. No.: 11/030,192

(22) Filed: Jan. 7, 2005

(65) Prior Publication Data

US 2005/0179004 A1   Aug. 18, 2005

(30) Foreign Application Priority Data

Jan. 9, 2004   (JP)   ............................. 2004-003802

(51) Int. Cl.
  *G02B 5/00*   (2006.01)
  *G02B 5/30*   (2006.01)
  *G02F 1/1335*   (2006.01)

(52) U.S. Cl. ..................... 428/1.1; 428/1.3; 428/1.31; 428/1.5; 428/1.6; 349/117

(58) Field of Classification Search ................ 428/1.1, 428/1.2, 1.3, 1.31, 1.5, 1.6; 349/117, 123; 252/299.01, 299.5, 299.62
See application file for complete search history.

(56) References Cited

U.S. PATENT DOCUMENTS

| 6,380,996 | B1 * | 4/2002 | Yokoyama et al. | ......... 349/117 |
| 2003/0223026 | A1 * | 12/2003 | Morishima et al. | ......... 349/117 |
| 2005/0129875 | A1 * | 6/2005 | Shukla et al. | ................. 428/1.2 |
| 2006/0035037 | A1 * | 2/2006 | Yoshizawa et al. | .......... 428/1.1 |

FOREIGN PATENT DOCUMENTS

| JP | 2001-330725 | * | 11/2001 |
| JP | 2002-038158 A | | 2/2002 |

OTHER PUBLICATIONS

English translation by computer for JP 2001-330725, http://www4.ipdl.ncipi.go.jp/Tokujitu/PAJdetail.ipdl?N0000=60&N0120=01&N2001=2&N3001=2001-330725.*

* cited by examiner

*Primary Examiner*—Shean C. Wu
(74) *Attorney, Agent, or Firm*—Buchanan Ingersoll & Rooney PC

(57) ABSTRACT

A composition comprising at least one compound having a fluoro-aliphatic group and at least one hydrophilic group selected from the group consisting of a carboxyl group (—COOH), a sulfo group (—$SO_3H$), a sulfato group (—$OSO_3H$), a phosphonoxy group {—OP(=O)$(OH)_2$} and salts thereof; at least one onium salt; and at least one liquid-crystal compound is disclosed.

10 Claims, 2 Drawing Sheets

COMPOSITION, OPTICAL COMPENSATORY FILM AND LIQUID CRYSTAL DISPLAY

CROSS-REFERENCE TO RELATED APPLICATIONS

This application claims benefit of priority under 35 USC 119 to Japanese Patent Application No. 2004-003802 filed Jan. 9, 2004.

TECHNICAL FIELD

The present invention relates to a liquid crystal display, and especially to an in-plane-switching (IPS) mode display which displays images by applying the crosswise field to liquid-crystal molecules aligned homogenously. The present invention also relates to an optical compensatory film or a composition useful for preparing the film.

RELATED ART

TN-mode liquid-crystal displays have been used widely. The TN-mode DLC usually comprises two polarizing plates and a liquid-crystal layer formed of twisted-orientated nematic liquid crystal sandwiched in between the polarizing plates, and the field is applied in an orthogonal direction to the substrate of the liquid-crystal layer. In the TN-mode, liquid-crystal molecules tilt against the substrate in a black state, and thus, birefringence due to such an orientation of the liquid-crystal molecules generates when being observed in an oblique direction, and light leakage occurs. In order to solve this problem, liquid-crystal cells are optically compensated by a film formed of hybrid-aligned liquid-crystal molecules, and such liquid-crystal displays are put to practical use. However, it is extremely difficult to optically compensate liquid-crystal cells perfectly even if liquid-crystal molecules are used, and it is not possible to avoid contrast inversions generating at under areas of images.

Liquid-crystal display employing in-plane switching (IPS) mode, in which the crosswise field are applied to liquid-crystal molecules, or employing vertically aligned (VA) mode, having multi domains divided by projections formed in a panel or slit electrodes, are provided, and are put to practical use. Recently, such liquid-crystal displays have been developed as a panel employed not only in monitors but also in TV, and the brightness thereof has been improved remarkably. Consequently, small light leakage generating at opposing corners in an oblique direction in a black state has come to the surface as a cause of lowering displaying-quality.

In order to improve color tone or viewing angle in a black state, it has been also tried that an optical compensatory material having a birefringence property is disposed between a liquid-crystal layer and a polarizing plate in an IPS mode display. Improved IPS mode displays are disclosed in JPA No. hei 9-80424 (the term "JPA" as used herein means an "unexamined published Japanese patent application (Kohkai Tokkyo Kohou)"), JPA hei 10-54982, JPA No. hei 11-202323, JPA No. hei 9-292522, JPA No. hei 11-133408, JPA No. hei 11-305217 and JPA No. hei 10-307291.

Many of the proposed methods are methods to improve viewing angles by counteracting the birefringence of liquid crystal in the cell, and cannot sufficiently prevent light leakage generating while the liquid-crystal displays are observed in oblique direction and, thus, the polarizing axes are out of orthogonal alignment. Some of the proposed methods are for lowering such light leakage and, however, even if such methods are employed, it is extremely difficult to optically compensate the liquid-crystal cell perfectly. Known optical compensatory sheets used for an IPS mode liquid-crystal cell are thick since they consists of plural films, and this is disadvantageous for thinning of liquid-crystal displays. Some of the optical compensatory sheets are prepared by laminating drawn films with adhesion layers. The adhesion layers shrink depending on variation of temperature or humidity, and, thus, some of the drawn films peel or film warpage is sometimes occurred.

SUMMARY OF THE INVENTION

One object of the present invention is to provide an IPS mode liquid-crystal display, having a simple configuration, improved in not only displaying-quality but also viewing angle. Another object of the present invention is to provide an optical compensatory film contributing to improvement of viewing angle of a liquid-crystal display, especially an IPS-mode liquid-crystal display, and a composition useful for producing such an optical compensatory film.

From one aspect, the present invention provides a composition comprising at least one compound having a fluoro-aliphatic group and at least one hydrophilic group selected from the group consisting of a carboxyl group (—COOH), a sulfo group (—SO$_3$H), a sulfato group (—OSO$_3$H), a phosphonoxy group {—OP(=O)(OH)$_2$} and salts thereof; at least one onium salt; and at least one liquid-crystal compound.

As embodiments of the present invention, the composition wherein the compound having a fluoro-aliphatic group is a copolymer comprising a repeating unit derived from a monomer having a fluoro-aliphatic group and a repeating unit represented by Formula (1):

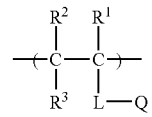

Formula (1)

wherein $R^1$, $R^2$ and $R^3$ respectively represent a hydrogen atom or a substituent; L represents a divalent linking group selected from the Linking Group shown below or a divalent linking group consisting of two or more selected from the Linking Group shown below;

(Linking Group)

a single bond, —O—, —CO—, —NR$^4$— (where $R^4$ represents a hydrogen atom, an alkyl group, an aryl group or an aralkyl group), —S—, —SO$_2$—, —P(=O)(OR$^5$)— (where $R^5$ represents an alkyl group, an aryl group or an aralkyl group), an alkylene group and arylene group;

Q represents a carboxyl group (—COOH) or a salt thereof, a sulfo group (—SO$_3$H) or a salt thereof, a sulfato group (—OSO$_3$H) or a salt thereof, or a phosphonoxy group {—OP(=O)(OH)$_2$} or a salt thereof; the composition wherein the compound having a fluoro-aliphatic group is a compound represented by Formula (2);

$$(R^0)_m\text{-}L^0\text{-}(W)_n \qquad \text{Formula (2)}$$

wherein $R^0$ denotes an alkyl group, an alkyl group having a terminal CF$_3$ group, or an alkyl group having a terminal CHF$_2$ group; m denotes an integer greater than or equal to 1, where multiple occurrences of $R^0$ may be identical or different, with at least one denoting an alkyl group having a terminal $CF_3$ group or a terminal $CHF_2$ group; $L^0$ denotes a linking group of valence (m+n); W denotes a carboxyl group (—COOH) or a salt thereof, a sulfo group (—$SO_3H$) or a salt thereof, a sulfato group (—$OSO_3H$) or a salt thereof, or a phosphonoxy group {—OP(=O)(OH)$_2$} or a salt thereof; and n denotes an integer greater than or equal to 1; the composition wherein the onium salt is a quaternary ammonium salt; the composition wherein the liquid-crystal compound is a discotic compound; the composition wherein the liquid-crystal compound is a triphenylene liquid-crystal compound; are provided.

From another aspect, the present invention provides an optical compensatory sheet comprising at least one optically anisotropic layer formed of a composition comprising at least one compound having a fluoro-aliphatic group and at least one hydrophilic group selected from the group consisting of a carboxyl group (—COOH), a sulfo group (—$SO_3H$), a sulfato group (—$OSO_3H$), a phosphonoxy group {—OP(=O)(OH)$_2$} and salts thereof; at least one onium salt; and at least one liquid-crystal compound.

From another aspect, the present invention provides a liquid crystal display comprising, in this order, a first polarizing film, an optical compensatory film comprising a first retardation-area contacting with the first polarizing film and a second retardation-area contacting with the first retardation-area, and a liquid-crystal cell comprising a pair of a first and a second substrates and a liquid crystal layer formed of a nematic liquid-crystal material sandwiched in between the pair of the substrates, and molecules of the nematic liquid-crystal being parallel to surfaces of the pair of substrates in a black state; wherein the first retardation-area has an in-plane retardation value, Re, of not greater than 20 nm; and a retardation value in thickness direction, Rth, falling within a range from 20 to 120 nm; the second retardation area comprises an optically anisotropic layer which is formed of a composition comprising at least one compound having a fluoro-aliphatic group and at least one hydrophilic group selected from the group consisting of a carboxyl group (—COOH), a sulfo group (—$SO_3H$), a sulfato group (—$OSO_3H$), a phosphonoxy group {—OP(=O)(OH)$_2$} and salts thereof; at least one onium salt; and at least one discotic liquid-crystal compound; and in which molecules of the discotic liquid-crystal compound being substantially aligned vertically; and a slow axis of the second retardation-area is parallel to both of a transmission axis of the first polarizing film and a slow axis of the liquid crystal layer in a black state.

As embodiments of the present invention, the liquid crystal display comprising a second polarizing film disposed outside of the second substrate; the liquid crystal display wherein the second retardation-area has Re falling within a range from 50 to 200 nm; the liquid crystal display wherein the first retardation-area comprises plural layers and one layer of the plural layers contacting with the second retardation-area is an alignment layer; the liquid crystal display comprising a pair of protective layers sandwiching the second retardation-area, wherein one of the protective layers disposed nearer to the liquid-crystal layer than another has Rth not greater than 20 nm; the liquid crystal display comprising a pair of protective layers sandwiching the second retardation-area, wherein one of the protective layers disposed nearer to the liquid-crystal layer than another is a cellulose acylate film or a norbornene or norbornene-derivative film; the liquid crystal display comprising a pair of protective layers sandwiching the second retardation-area, wherein one of the protective layers disposed nearer to the liquid-crystal layer than another comprises a cellulose acylate film and a layer comprising rod-like liquid-crystal compound aligned vertically; the liquid crystal display wherein the first retardation-area comprises plural layers and one layer of the plural layers contacting with the first polarizing film is capable of being a protective layer of the first polarizing film; are provided.

From another embodiment, the present invention provides an optical compensatory film comprising a transparent support and an optically anisotropic layer having an air-interface and an alignment-layer-interface, wherein the optically anisotropic layer comprises at least one liquid-crystal compound, at least one compound capable of increasing or decreasing a tilt angle of the liquid-crystal compound at the air-interface and at least one compound capable of increasing or decreasing a tilt angle of the liquid-crystal compound at the alignment-layer-interface.

Figure 1:
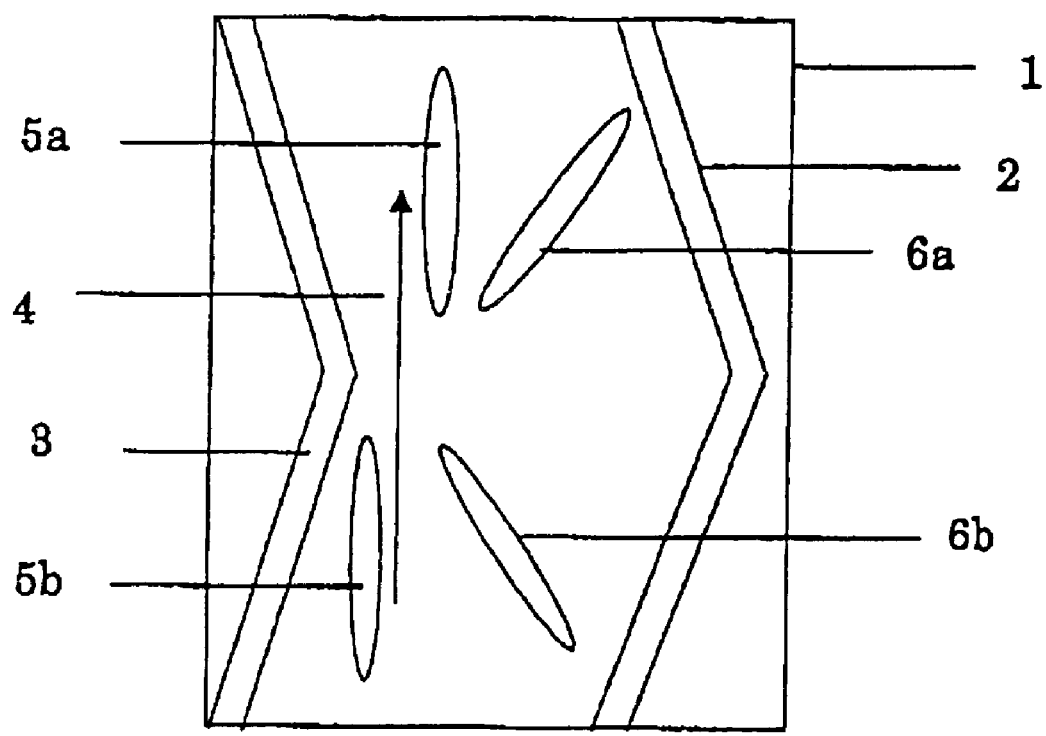
FIG. 1 is a viewing showing a frame format of an example of a pixel area of the liquid-crystal display of the present invention.

In figures, the numerical numbers mean as follows:
1 a pixel area,
2 a pixel electrode,
3 a displaying electrode,
4 a rubbing direction,
5*a* and 5*b* directors of liquid-crystal molecules in a black state,
6*a* and 6*b* directors of liquid-crystal molecules in a white state,
7*a* and 7*b* protective films for a first polarizing film,
8 a first polarizing film,
9 a transmission axis of a first polarizing film,
10 an optical compensatory film,
11 a first retardation area,
12 a second retardation area,
13 a slow axis of a second retardation area,
14 a first substrate,
15 a rubbing direction of a first substrate,
16 a liquid-crystal layer,
17 a slow axis of liquid-crystal molecules,
18 a second substrate,
20 a rubbing direction of a second substrate,
20*a* and 20*b* protective films for a second polarizing film,
21 a second polarizing film and
22 a transmission axis of a second polarizing film.

DETAILED DESCRIPTION OF THE INVENTION

Hereafter, the present invention will be explained in detail. In the specification, ranges indicated with "to" mean ranges including the numerical values before and after "to" as the minimum and maximum values.

In the specification, the term of "A is parallel to B" or the term of "A is orthogonal to B" means that the angle between A and B falls within a range of an exact angle ±10°. The angle desirably falls within a range of an exact angle ±5°, and more desirably within a range of an exact angle ±2°. The term of "substantial verticality" means that an angle falls within a range of an exact angle ±20°. The angle desirably falls within a range of an exact angle ±15°, and more desirably within a range of an exact angle ±10°. The term of "slow axis" means a direction giving a maximum refractive index. As long as written specifically, refractive indexes are measured at 550 nm.

In the specification, the terms of "polarizing plate" means not only polarizing plates having a proper size to be employed in a liquid-crystal but also long polarizing plates before being cut. And in the specification, the terms of "polarizing film" is distinct from the term "polarizing plate", and the term of "polarizing plate" is used for any laminated body comprising a "polarizing film" and at least one protective film thereon.

[Composition]

The present invention relates to a composition comprising at least one compound having a fluoro-aliphatic group and at least one hydrophilic group selected from the group consisting of a carboxyl group (—COOH), a sulfo group (—SO$_3$H), a sulfato group (—OSO$_3$H), a phosphonoxy group {—OP(=O)(OH)$_2$} and salts thereof; at least one onium salt; and at least one liquid-crystal compound. The compound, having a fluoro-aliphatic group and a hydrophilic group, may contribute to promoting a vertical-alignment of molecules of the liquid-crystal compound, especially discotic liquid-crystal compound, at an air interface. On the other hand, the onium salt may contribute to promoting a vertical-alignment of molecules of the liquid-crystal compound, especially discotic liquid-crystal compound, at an alignment-layer-interface. These ingredients may be localized in the air-interface or the alignment-layer-interface side respectively and give an effect such as an volume-excluding effect, an electrostatic effect or a surface energy effect on the liquid-crystal molecules so as to align them vertically. When the molecules are discotic molecules, the effect, which can align liquid-crystal molecules vertically, corresponds to an effect which can decrease a tilt angel of a director of the discotic molecules, or in other words, an effect which can decrease an angle between the director and a surface of the layer at an air-side. The compound, having a fluoro-aliphatic group and a hydrophilic group, is desirably selected from polymers, capable of giving a volume-excluding effect, comprising an inflexible unit. Such compounds can decrease a tilt angle of a director of the discotic molecules at an air-interface, and contribute to improvement in coating property of the composition and reduction of unevenness ("mura") or cissing ("hajiki") or the like.

The compound, having a fluoro-aliphatic group and a hydrophilic group, which can be selected from polymers or compounds having a low-molecular weight, may have a polymerizable group, and in such case, the compound can also contribute to fixing alignments of liquid-crystal molecules. (Compound having a fluoro-aliphatic group and a hydrophilic group: Agent for vertical-alignment at an air-interface)

According to the present invention, the compound, having a fluoro-aliphatic group and a hydrophilic group, is desirably selected from the group consisting of fluoride-polymers having a fluoro-aliphatic group and at least one hydrophilic group and fluoride-compounds represented by a formula (2).

First, the fluoride-polymers, which can be employed in the present invention, will be described in detail.

<<Fluoride-polymer>>

According to the present invention, a polymer having a fluoro-aliphatic group and a hydrophilic group selected from the group consisting of a carboxyl group (—COOH), a sulfo group (—SO$_3$H), a sulfato group (—OSO$_3$H), a phosphonoxy group {—OP(=O)(OH)$_2$} and salts thereof in a side chain can be used as a fluoride-polymer. Various polymer types are described on pages 1 to 4 in "Revision Chemistry of Polymer Synthesis (Kaitei Porimar Gousei no Kagaku)" written by OHTSU TAKAYUKI and published by Kagaku-Dojin Publishing Company, Inc in 1968, and the fluoride-polymer may be selected the described polymer types such as polyolefins, polyesters, polyamides, polyimides, polyurethanes, polycarbonates, polysulfones, polyethers, polyacetals, polyketones, polyphenylene-oxides, polyphenylene-sulfides, polyarylates, PTFEs, polyvinylidene-fluorides or cellulose derivatives. The fluoride-polymer is desirably selected from polyolefins.

The fluoride-polymer employed in the present invention has a fluoro-aliphatic group in side chain. The carbon number of the fluoro-aliphatic group is desirably from 1 to 12 and more desirably from 6 to 10. The aliphatic group may have a chain or cyclic structure, and the chain structure may be linear or branched. Among those, linear $C_{6-10}$ fluoro-aliphatic groups are preferred. The fluorine-substitution degree of the fluoro-aliphatic group is desirably decided, however not to be limited to, such that not less than 50%, more desirably not less than 60%, of all carbon atoms in the corresponding aliphatic group are replaced with fluorine atoms. The fluoro-aliphatic group in side chain may bind to a main chain through a linking group such as an ester linkage, amide linkage, imido linkage, urethane linkage, urea linkage, ether linkage, thioether linkage or aromatic ring. The fluoro-aliphatic group maybe derived from a fluoro aliphatic compound prepared by a telomerization method, occasionally referred to as telomer method, or an oligomerization, occasionally referred to as oligomer method. Examples of preparation of the fluoride-aliphatic compound are described on pages 117 to 118 in "Synthesis and Function of Fluoride Compounds (Fussokagoubutsu no Gousei to Kinou)" overseen by ISHIKAWA NOBUO and published by CMC Publishing Co., Ltd in 1987; and on pages 747 to 752 in "Chemistry of organic Fluorine Compounds II", Monograph 187, Ed by Milos Hudlicky and Attila E. Pavlath, American Chemical Society 1995; and the like. The telomerization method is a method for producing a telomer by carrying out radical polymerization of fluorine-containing compound such as tetrafluoroethylene in the presence of an alkylhalide such as iodide, having a large chain-transfer constant number, as a telogen. One example is shown in Scheme-I Scheme 1

The obtained fluorine-terminated telomers are usually terminal-modified properly as shown in Scheme 2, to give fluoro aliphatic compounds. These compounds are, if necessary, transferred to a desired monomer structure, and then used for preparing fluoro-aliphatic containing polymers.

Scheme 2

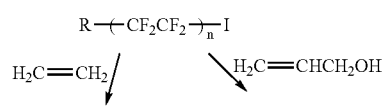

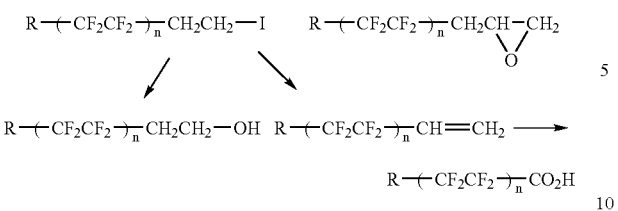
Examples of the fluoride monomer which can be used for preparing the fluoride-polymer employed in the present invention include, however not to be limited to, compounds shown below.
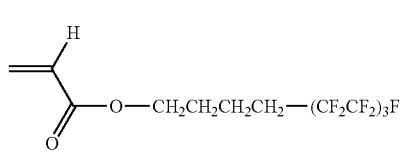
F-1
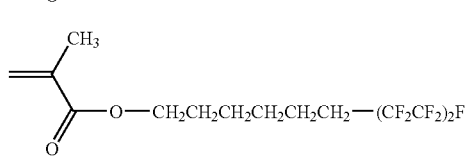
F-2
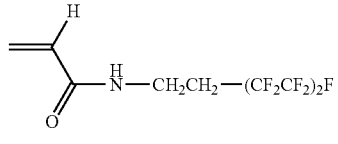
F-3
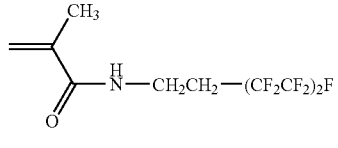
F-4
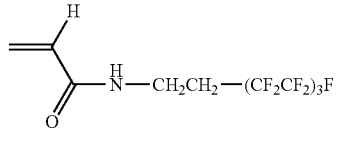
F-5
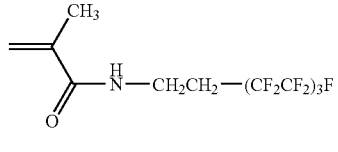
F-6
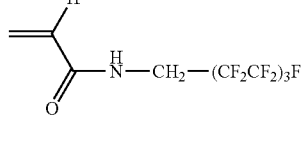
F-7
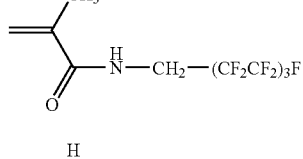
F-8
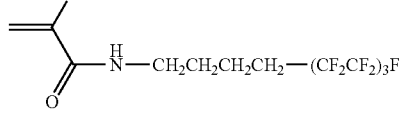
F-9
F-10
F-11
F-12
F-13
F-14
F-15
F-16
F-17
F-18
F-19

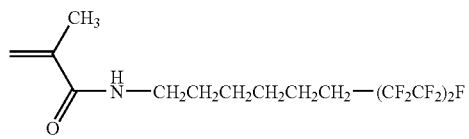
F-20
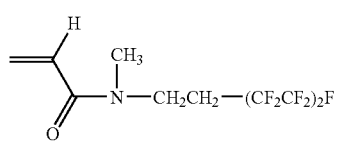
F-21
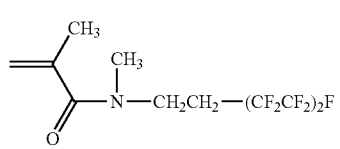
F-22
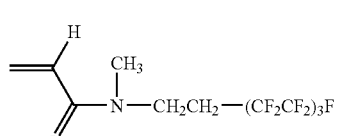
F-23
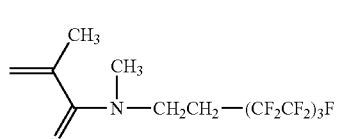
F-24
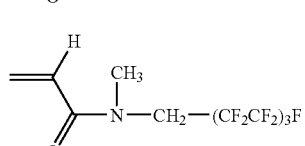
F-25
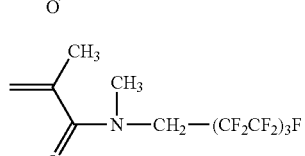
F-26
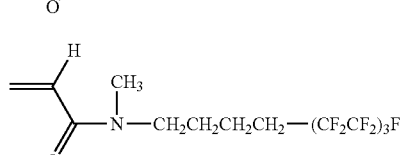
F-27
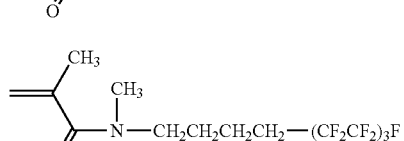
F-28
F-29
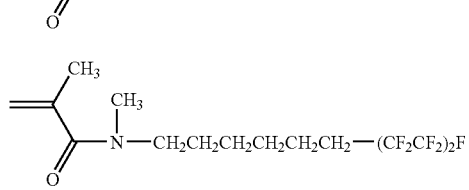
F-30
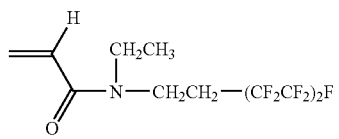
F-31
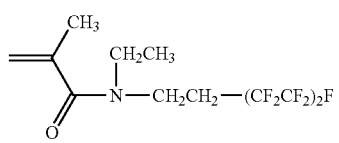
F-32
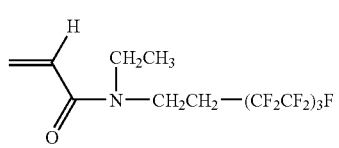
F-33
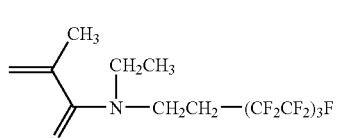
F-34
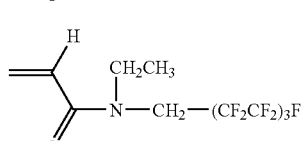
F-35
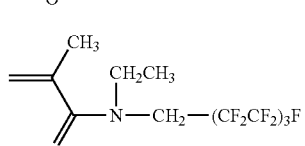
F-36
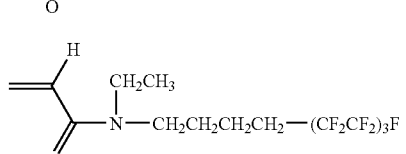
F-37
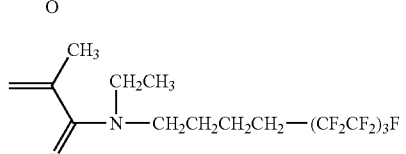
F-38
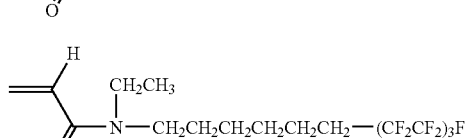
F-39
F-40
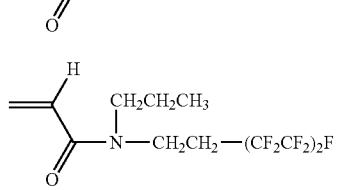
F-41

-continued
F-42
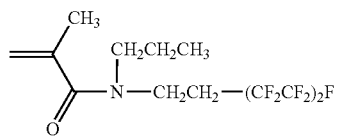
F-43
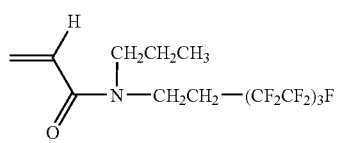
F-44
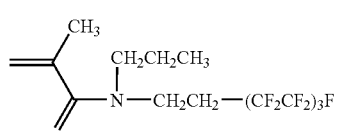
F-45
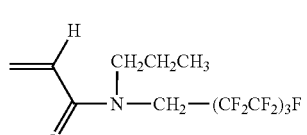
F-46
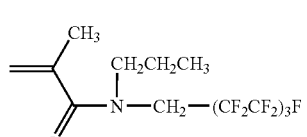
F-47
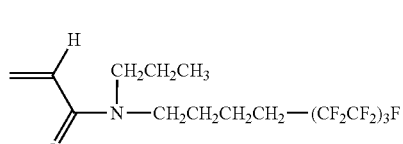
F-48
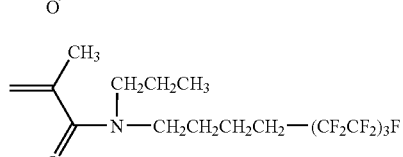
F-49
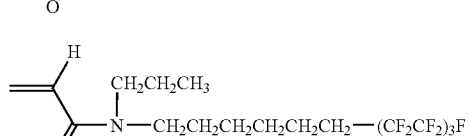
F-50
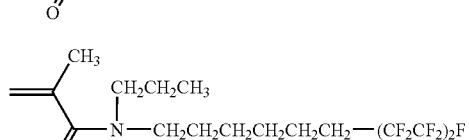
F-51
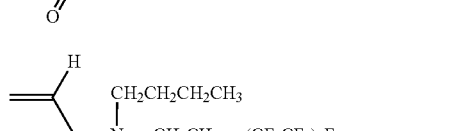
F-52
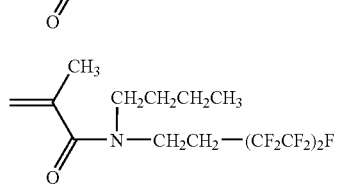
-continued
F-53
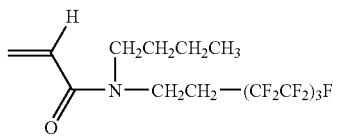
F-54
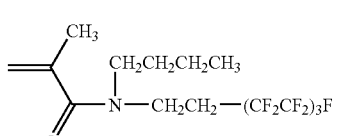
F-55
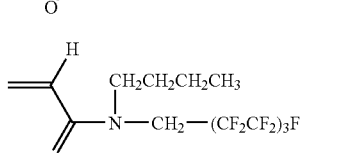
F-56
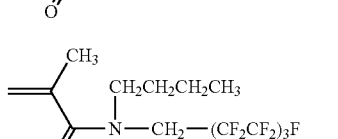
F-57
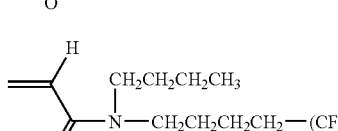
F-58
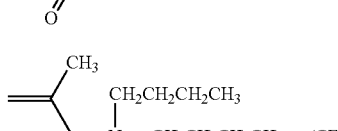
F-59
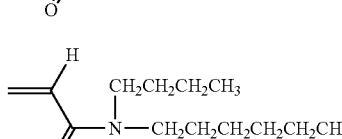
F-60
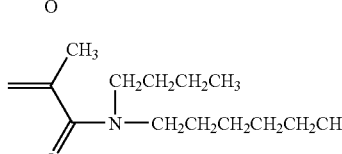
F-61
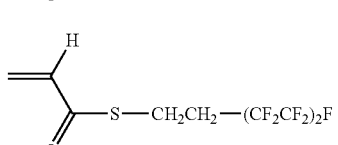
F-62
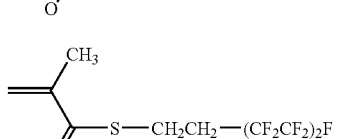
F-63

-continued

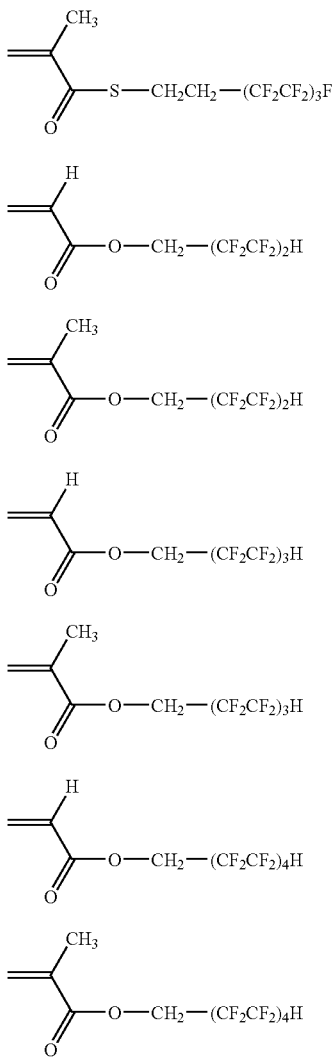

F-64
F-65
F-66
F-67
F-68
F-69
F-70

One example of the fluoride-polymer which can be employed in the present invention is selected from copolymers comprising a repeating unit derived from a monomer having a fluoro-aliphatic group and a repeating unit, having a hydrophilic group, represented by a formula (1).

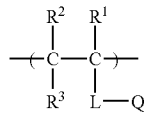

Formula (1)

In the formula (1), $R^1$, $R^2$ and $R^3$ respectively represent a hydrogen atom or a substituent. Q is a carboxyl group (—COOH) or a salt thereof, a sulfo group (—SO$_3$H) or a salt thereof, a sulfato group (—OSO$_3$H) or a salt thereof, or a phoshonoxy group {—OP(=O)(OH)$_2$} or a salt thereof. L is a linking group selected from Linkage Group I shown below or a divalent group consisting of two or more selected from Linkage Group I shown below:

(Linkage Group I)

a single bond, —O—, —CO—, —NR$^4$— ($R^4$ is a hydrogen atom, an alkyl group, an aryl group or an aralkyl group), —S—, —SO$_2$—, —P(=O)(OR$^5$)— ($R^5$ is an alkyl group, an aryl group or aralkyl group), an alkylene group and arylene group.

In the formula (1), $R^1$, $R^2$ and $R^3$ respectively represent a hydrogen atom or a substituent selected from Substituent Group Y shown below:

(Substituent Group Y)

an alkyl group (desirably $C_{1-20}$, more desirably $C_{1-12}$ and much more desirably $C_{1-8}$ alkyl group) such as methyl, ethyl, isopropyl, tert-butyl, n-octyl, n-decyl, n-hexadecyl, cyclopropyl, cyclopentyl or cyclohexyl; an alkenyl group (desirably $C_{2-20}$, more desirably $C_{2-12}$ and much more desirably $C_{2-8}$ alkenyl group) such as vinyl, allyl, 2-butenyl or 3-pentenyl; an alkynyl group (desirably $C_{2-20}$, more desirably $C_{2-12}$ and much more desirably $C_{2-8}$ alkynyl group) such as propargyl or 3-pentynyl; an aryl group (desirably $C_{6-30}$, more desirably $C_{6-20}$ and much more desirably $C_{6-12}$ aryl group) such as phenyl, p-methylphenyl or naphthyl; an aralkyl group (desirably $C_{7-30}$, more desirably $C_{7-20}$ and much more desirably $C_{7-12}$ aralkyl group) such as benzyl, phenethyl or 3-phenylpropyl; a substituted or unsubstituted amino group (desirably $C_{0-20}$, more desirably $C_{0-10}$ and much more desirably $C_{0-6}$ amino group) such as unsubstituted amino, methylamino, dimethylamino, diethylamino or anilino; an alkoxy group (desirably $C_{1-20}$, more desirably $C_{1-16}$ and much more desirably $C_{1-10}$ alkoxy group) such as methoxy, ethoxy or butoxy; an alkoxycarbonyl group (desirably $C_{2-20}$, more desirably $C_{2-16}$ and much more desirably $C_{2-10}$ alkoxy carbonyl group) such as methoxycarbonyl or ethoxycarbonyl; an acyloxy group (desirably $C_{2-20}$, more desirably $C_{2-16}$ and much more desirably $C_{2-10}$ acyloxy group) such as acetoxy or benzoyloxy; an acylamino group (desirably $C_{2-20}$, more desirably $C_{2-16}$ and much more desirably $C_{2-10}$ acylamino group) such as acetylamino or benzoylamino; an alkoxycarbonylamino group (desirably $C_{2-20}$, more desirably $C_{2-16}$ and much more desirably $C_{2-12}$ alkoxycarbonylamino group) such as methoxycarbonyl amino; an aryloxycarbonylamino group (desirably $C_{7-20}$, more desirably $C_{7-16}$ and much more desirably $C_{7-12}$ aryloxycarbonylamino group) such as phenyloxycarbonyl amino group; a sulfonylamino group (desirably $C_{1-20}$, more desirably $C_{1-16}$ and much more desirably $C_{1-12}$ sulfonylamino group) such as methylsulfonylamino or benzenesulfonylamino group; a sulfamoyl group (desirably $C_{0-20}$, more desirably $C_{0-16}$ and much more desirably $C_{0-12}$ sulfamoyl group) such as unsubstituted sulfamoyl, methylsulfamoyl, dimethylsulfamoyl or phenylsulfamoyl; a carbamoyl group (desirably $C_{1-20}$, more desirably $C_{1-16}$ and much more desirably $C_{1-12}$ carbamoyl group) such as unsubstituted carbamoyl, methylcarbamoyl, diethylcarbamoyl or phenylcarbamoyl; an alkylthio group (desirably $C_{1-20}$, more desirably $C_{1-16}$ and much more desirably $C_{1-12}$ alkylthio group) such as methylthio or ethylthio; an arylthio group (desirably $C_{6-20}$, more desirably $C_{6-16}$ and much more desirably $C_{6-12}$ arylthio group) such as phenylthio; a sulfonyl group (desirably $C_{1-20}$, more desirably $C_{1-16}$ and much more desirably $C_{1-12}$ sulfonyl group) such as mesyl or tosyl; a sulfinyl group (desirably $C_{1-20}$, more desirably $C_{1-16}$ and much more desirably $C_{1-12}$ sulfinyl group) such as methane sulfinyl or benzenesulfinyl; an ureido group (desirably $C_{1-20}$, more desirably $C_{1-16}$ and much more desirably $C_{1-12}$ ureido group) such as unsubstituted ureido, methylureido or phenylureido; a phosphoric amide (desirably $C_{1-20}$, more desirably $C_{1-16}$ and much more desirably $C^{1-12}$ phosphoric amide) such as diethylphosphoric amide or phenylphosphoric amide; a hydroxy group, a mercapto group, a halogen atom such as fluorine, chlorine, bromine or iodine; a cyano group, a sulfo group, a carboxyl group, a nitoro group, a hydroxamic acid group, a sulfino group, a hydrazino group, an imino group, a hetero cyclic group (desirably $C_{1-30}$ and more desirably $C_{1-12}$ heterocyclic group comprising at least one hetero atom such as nitrogen, oxygen or sulfur) such as imidazolyl, pyridyl, quinolyl, furyl, piperidyl, morpholino, benzoxazolyl, benzimidazolyl or benzthiazolyl; and a silyl group (desirably $C_{3-40}$, more desirably $C_{3-30}$ and much more desirably $C_{3-24}$ silyl group) such as trimethylsilyl or triphenylsilyl. These substituents may be substituted by at least one substituent selected from these. When two substituents are selected, they may be same or different each other. Two or more may, if possible, bond each other to form a ring.

It is preferred that $R^1$, $R^2$ and $R^3$ respectively represent a hydrogen atom, an alkyl group, a halogen atom (such as fluorine, chlorine, bromine or iodine) or a group represented by -L-Q described later; more preferred that $R^1$, $R^2$ and $R^3$ respectively represent a hydrogen atom, a $C_{1-6}$ alkyl group, chlorine or a group represented by -L-Q described later; much more preferred that $R^1$, $R^2$ and $R^3$ respectively represent a hydrogen atom or a $C_{1-4}$ alkyl group; further much more preferred that $R^1$, $R^2$ and $R^3$ respectively represent a hydrogen atom or a $C_{1-2}$ alkyl group; and most preferred that $R^2$ and $R^3$ are hydrogen and $R^1$ is hydrogen or methyl. Examples of the alkyl group include methyl, ethyl, n-propyl, n-butyl and sec-butyl. The alkyl group may have any substituent. Examples of the substituent include a halogen atom, an aryl group, a heterocyclic group, an alkoxyl group, an aryloxy group, an alkylthio group, an arylthio group, an acyl group, a hydroxy group, an acyloxy group, an amino group, an alkoxycarbonyl group, an acylamino group, an oxycarbonyl group, a carbamoyl group, a sulfonyl group, a sulfamoyl group, a sulfonamido group, a sulfonyl group and a carboxyl group. It is noted that when the alkyl group has any substituent, the carbon atom number of the alkyl group, described above, is the number of the carbon atoms included in the only alkyl group, and the carbon atoms included in the substituent are not counted. Numbers of carbon atoms included in the other groups described later are defined as same as that of the alkyl group.

L is a divalent linking group selected from the above defined group or any combination of two or more selected from the above identified group. The $R^4$ in —$NR^4$— described above represents a hydrogen atom, an alkyl group, an aryl group or an aralkyl group, and desirably a hydrogen atom or an alkyl group. And the $R^5$ in —$PO(OR^5)$— represents an alkyl group, an aryl group or an aralkyl group, and desirably an alkyl group. When $R^4$ or $R^5$ is an alkyl group, an aryl group or an aralkyl group, the desired carbon numbers of them are same as those described in Substituent Group Y. L desirably contains a single bond, —O—, —CO—, —$NR^4$—, —S—, —$SO_2$—, an alkylene group or arylene group; more desirably contains a single bond, —CO—, —O—, —$NR^4$—, an alkylene group or an arylene group; and much more desirably represents a single bond. When L contains an alkylene group, the carbon atom number of the alkylene group is desirably from 1 to 10, more desirably from 1 to 8 and much more desirably from 1 to 6. Preferred examples of the alkylene group include methylene, ethylene, trimethylene, tetrabutylene and hexamethylene. When L contains an arylene group, the carbon atom number of the arylene group is desirably from 6 to 24, more desirably from 6 to 18 and much more desirably from 6 to 12. Preferred examples of the arylene group include phenylene and naphthalene. When L contains a divalent linking group consisting of a combination of an alkylene group and an arylene group, or in other words an aralkyl group, the carbon atom number in the aralkyl group is desirably from 7 to 34, more desirably from 7 to 26 and much more desirably from 7 to 16. Preferred examples of the aralkyl group include phenylene methylene, phenylene ethylene and methylene phenylene. L may have any substituent. Examples of the substituent are same as those exemplified for the substituent of $R^1$, $R^2$ or $R^3$.

Examples of L include, however not to be limited to, those shown below.

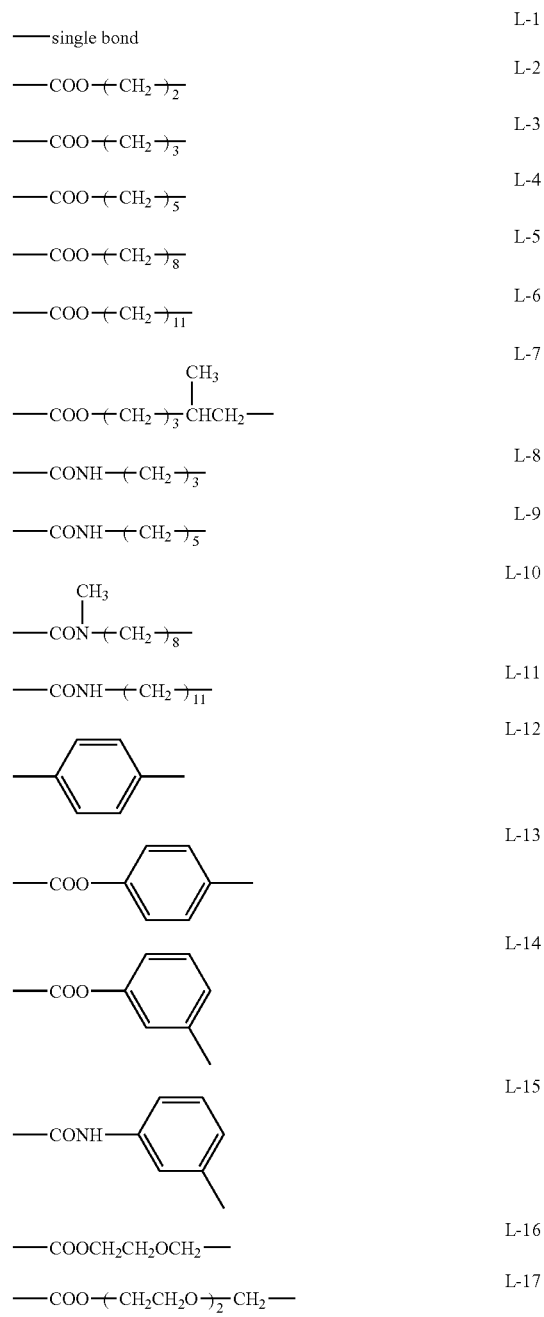

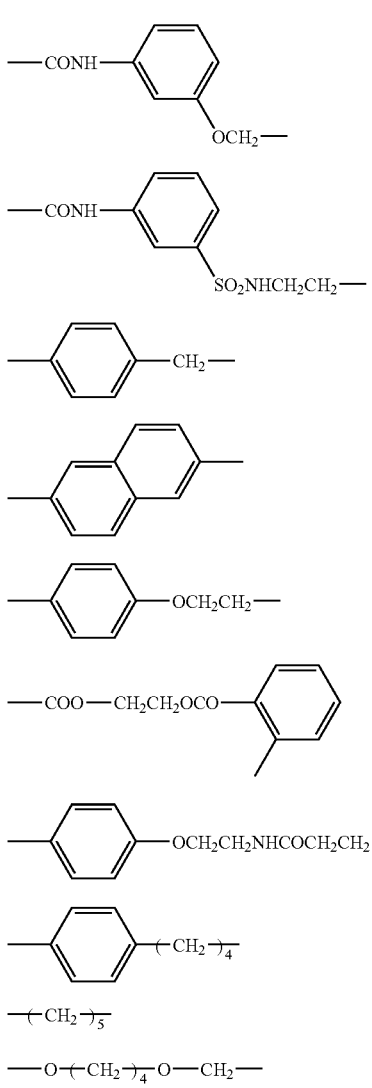

In the formula (1), Q represents a carboxyl group or a carboxylate such as lithium carboxylate, sodium carboxylate, potassium carboxylate, ammonium carboxylate (for example, unsubstituted ammonium carboxylate, tetramethylammonium carboxylate, trimethyl-2-hydroxyethylammmonium carboxylate, tetrabutylammonium carboxylate, trimethylbenzylammonium carboxylate or dimethylphanylammmonium carboxylate) or pyridinium carboxylate; a sulfo group or a sulfate (examples of a counter cation are same as those exemplified for the carboxylate above); or a phosphonoxy group or a phosphonoxylate (examples of a counter cation are same as those exemplified for the carboxylate above). Q is desirably a carboxyl group, a sulfo group or a phosphonox group, and more desirably a carboxyl group or a sulfo group.

The fluoride-polymer may comprise one repeating unit selected from the formula (1), or plural repeating units selected from the group (1). The fluoride-polymer may further comprise at least one repeating unit other than those described above. The other repeating unit is not limited and is desirably selected from units derived from monomers capable of usual radical polymerization. Examples of the monomer which can give the other repeating unit include, however not to be limited to, those shown below. The fluoride-polymer may comprise one repeating unit or plural repeating units selected from those shown below.

(Monomer Group I)
(1) Alkenes:
ethylene, propylene, 1-buten, isobuten, 1-hexene, 1-dodecene, 1-octadecene, 1-eicocene, hexafluoropropene, vinylidene fluoride, chlorotrifluoroethylene, 3,3,3-trifuluoropropylene, tetrafluoroethylene, vinyl chloride, vinylidene chloride or the like;

(2) Dienes:
1,3-butadinene, isoprene, 1,3-pentadiene, 2-ethyl-1,3-butadiene, 2-n-propyl-1,3-butadiene, 2,3-dimethyl-1,3-butadiene, 2-methyl-1,3-pentadiene, 1-phenyl-1,3-butadiene, 1-a-naphtyl-1,3-butadiene, 1-β-naphtyl-1,3-butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene, 2-cyano-1,3-butadiene, 1,4-divinyl cyclohexane or the like;

(3) a,β-unsaturated carboxylic acid derivatives:
(3a) Alkyl acrylates:
methyl methacrylate, ethyl acrylate, n-propyl acrylate, isopropyl acrylate, n-butyl acrylate, isobutyl acrylate, sec-butyl acrylate, tert-butyl acrylate, amyl acrylate, n-hexyl acrylate, cyclohexyl acrylate, 2-ethylhexyl acrylate, n-octyl acrylate, tert-octyl acrylate, dodecyl acrylate, phenyl acrylate, benzyl acrylate, 2-chloroethyl acrylate, 2-bromoethyl acrylate, 4-chlorobutyl acrylate, 2-cyanoethyl acrylate, 2-acetoxyethyl acrylate, methoxybenzyl acrylate, 2-chlorocyclohexyl acrylate, furfuryl acrylate, tetrahydrofurfuryl acrylate, 2-methoxyethyl acrylate, ω-methoxy polyethyleneglycol acrylate (having additional molar number, n, of 2 to 100), 3-metoxybutyl acrylate, 2-ethoxyethyl acrylate, 2-butoxyethyl acrylate, 2-(2-butoxyethoxy)ethyl acrylate, 1-bromo-2-methoxyethyl acrylate, 1,1-dichloro-2-ethoxyethyl acrylate, glycidyl acrylate or the like;

(3b) Alkyl methacrylates:
methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, n-hexyl methacrylate, cyclohexyl methacrylate, 2-ethylhexyl methacrylate, n-octyl methacrylate, stearyl methacrylate, benzyl methacrylate, phenyl methacrylate, allyl methacrylate, furfuryl methacrylate, tetarahydrofurfuryl methacrylate, crezyl methacrylate, naphthyl methacrylate, 2-methoxyethyl methacrylate, 3-methoxybutyl methacrylate, ω-methoxypolyethyleneglycol methacrylate (having additional molar number, n, of 2 to 100), 2-acetoxyethyl methacrylate, 2-ethoxyethyl methacrylate, 2-butoxyethyl methacrylate, 2-(2-butoxyethoxy)ethyl methacrylate, glycidyl methacrylate, 3-trimetoxysilylpropyl methacrylate, allyl methacrylate, 2-isosyanate ethyl methacrylate or the like;

(3c) Diesters of unsaturated polycarboxylic acids:
dimethyl maleate, d4butyl maleate, dimethyl itaconate, dibutyl itaconate, dibutyl crotonate, dihexyl crotonate, diethyl fumarate, dimethyl fumarate or the like;

(3d) Amides of a,β-unsaturated carboxylic acids:
N,N-dimethyl acrylamide, N,N-diethyl acrylamide, N-n-propyl acrylamide, N-tert-butyl acrylamide, N-tert-octyl acrylamide, N-cyclohexyl acrylamide, N-phenyl acrylamide, N-(2-acetoacetoxyethyl)acrylamide, N-benzyl acrylamide, N-acryloyl morpholine, diacetone acrylamide, N-methyl maleimide or the like;

(4) Unsaturated nitriles:

acrylonitrile, methacrylonitrile or the like;

(5) Styrene or derivatives thereof:

styrene, vinyltoluene, ethylstyrene, p-tert-butylstyrene, p-vinyl methyl benzoate, a-methyl styrene, p-chloromethyl styrene, vinyl naphthalene, p-methoxy styrene, p-hydroxy methyl styrene, p-acetoxy styrene or the like;

(6) Vinyl esters:

vinyl acetate, vinyl propanate, vinyl butyrate, vinyl isobutyrate, vinyl benzoate, vinyl salicylate, vinyl chloroacetate, vinyl methoxy acetate, vinyl phenyl acetate or the like;

(7) Vinyl ethers:

methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, n-eicosyl vinyl ether, 2-ethylhexyl vinyl ether, cyclohexyl vinyl ether, fluorobutyl vinyl ether, fluorobutoxyethyl vinyl ether or the like; and (8) Other monomers N-vinyl pyrrolidone, methyl vinyl ketone, phenyl vinyl ketone, methoxy ethyl vinyl ketone, 2-vinyl oxazoline, 2-isoprppenyl oxazoline or the like.

The amount of the monomer containing a fluoro aliphatic group is desirably not less than 5 wt %, more desirably not less than 10 wt %, and much more desirably not less than 30 wt % with respect to the total amount of all monomers constituting the fluoride-polymer. The amount of the repeating unit represented by the formula (1) is desirably not less than 0.5 wt %, more desirably from 1 to 20 wt % and much more desirably from 1 to 10 wt % with respect to the total amount of all monomers constituting the fluoride-polymer.

The preferred range of the weight percent may easily vary with a molecular weight of a monomer to be used, and thus, the preferred range of a molar number of a function group per unit weight may more properly define a preferred range of an amount of the repeating unit represented by the formula (1). Using the molar number, the preferred amount of a hydrophilic group (Q in the formula (1)) contained in the fluoride-polymer is from 0.1 mmol/g to 10 mmol/g and the more preferred amount is from 0.2 mmol/g to 8 mmol/g.

The weight-average molecular weight (Mw) of the fluoride-polymer to be used in the present invention is desirably not greater than 1,000,000, more desirably not greater than 500,000 and much more desirably not greater than 100,000. The Mw can be measured as a polystyrene (PS) equivalent molecular weight with gel permeation chromatography (GPC).

Examples of the method for producing the fluoride-polymer include, however not to be limited to, a radical-polymerization or a cation-polymerization employing a vinyl group and an anion-polymerization, and among them, a radical-polymerization is preferred since it is common. Known radical thermal or radical photo polymerization initiators may be used in the process for producing the fluoride-polymer. Especially, radical thermal polymerization initiators are preferred. It is noted that a radical thermal polymerization is a compound capable of generating radicals when being heated at a decomposition temperature or a higher temperature than it. Examples of the radical thermal polymerization include diacyl peroxides such as acetyl peroxide or benzoyl peroxide; ketone peroxides such as methyl ethyl ketone peroxide or cyclohexanone peroxide; hydro peroxides such as hydrogen peroxide, tert-butylhydro peroxide or cumenehydro peroxide; dialkyl peroxides such as di-tert-butylperoxide, dicumyl peroxide or dilauroyl peroxide; peroxy esters such as tert-butylperoxy acetate or tert-butylperoxy pivalate; azo-based compounds such as azo bis iso-butylonitrile or azo bis iso-valeronitrile and persulfates such as ammonium persulfate, sodium persulfate or potassium persulfate. A single polymerization initiator may be used, or plural types of polymerization initiators may be used in combination.

The radical polymerization may be carried out according to any process such as an emulsion polymerization, dispersion polymerization, a bulk polymerization or a solution polymerization process. One of the typical radical polymerization may be carried out according to a solution polymerization, and is more specifically described below. The details of other polymerization processes are as same as those described below, and for details, it is possible to refer to "Experimental Methods of Polymer Science (Kohbunshi kagaku jikkenn-hoh)" published by TOKYO KAGAKU DOZIN CO., LTD. in 1981 or the like.

For solution polymerization, at least one organic solvent is used. The organic solvent can be selected from any organic solvents which never limit the purpose or the effect of the present invention. Organic solvents are usually understood as an organic compound having a boiling point of 50 to 200° C. at atmosphere pressure, and among them, organic compounds capable of dissolving the components uniformly are preferred. Preferred examples of the organic solvent include alcohols such as isopropanol or butanol; ethers such as dibutyl ether, ethylene glycol dimethyl ether, tetrahydrofuran or dioxane; ketones such as acetone, methyl ethyl ketone, methyl isobutyl ketone or cyclohexanone; esters such as ethyl acetate, butyl acetate, amyl acetate or γ-butyrolactone; aromatic hydrocarbons such as benzene, toluene or xylene. A single organic solvent may be used, or plural types of the organic solvents may be used in combination. Mixed solvents which are prepared by mixing at least one organic solvent and water may also used from the view point of solubility of monomers to be used or polymers to be produced.

The solution polymerization may be carried out, however not to be limited to, at a temperature of 50 to 200° C. for a time of 10 to 30 minutes. Inert gas purge is desirably performed before or while carrying out the solution polymerization to avoid deactivation of the generated radicals. Nitrogen gas is usually used as an inert gas.

Radical polymerization with at least one chain transfer agent is useful for producing fluoride-polymers having a proper molecular weight. Examples of the chain transfer agent include mercaptans such as octyl mercaptan, decyl mercaptan, dodecyl mercaptan, tert-dodecyl meracptan, octadecyl mercaptan, thiophenol or p-nonyl thiophenol; polyhalogenated alkyls such as carbon tetrachloride, chloroform, 1,1,1-trichloroethane or 1,1,1-tribromo octane; and low-activity monomers such as a-methyl styrene or a-methyl styrene dimer. Among these, $C_{4-16}$ mercaptans are preferred. The amount of the chain transfer agent to be used should be precisely controlled depending on an activity thereof, a type of monomer to be used or polymerization conditions, and is usually, however not to be limited to, 0.01 to 50 mole %, desirably from 0.05 to 30 mole % and much more desirably from 0.09 to 25 mole % with respect to total moles of the monomers to be used. The timing or the method of addition of the chain transfer agent is not to be limited subjected to presence of the chain transfer agent in a polymerization system with at least one monomer to be controlled its polymerization degree during polymerization process. The chain transfer agent may be added by dissolving in the monomer, or in other words in the same time as addition of the monomer, or separately from the addition of the monomer.

As described above, in order to fix alignments of molecules liquid-crystal compounds, especially discotic liquid-crystal compounds, the fluoride-polymer desirably has a polymerizable group as a substituent.

Examples of the fluoride-polymer which can be used desirably in the present invention include, however not to be limited to, those shown below. Numerical values in formulae shown below mean wt % of each monomer, and Mw in formulae shown below mean PS-equivalent weight-average molecular weight measured by GPC. In the formulae, "a", "b", "c", "d" and the like mean weight ratios.

P-1
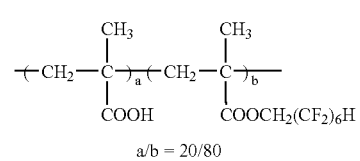
a/b = 20/80
Mw = 23000

P-2
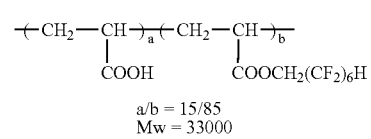
a/b = 15/85
Mw = 33000

P-3
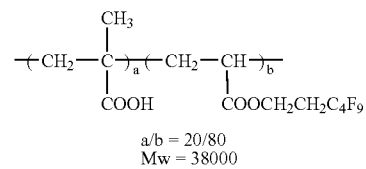
a/b = 20/80
Mw = 38000

P-4
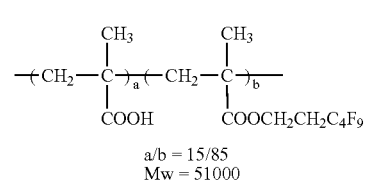
a/b = 15/85
Mw = 51000

P-5
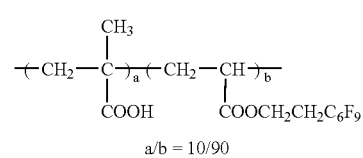
a/b = 10/90
Mw = 51000

P-6
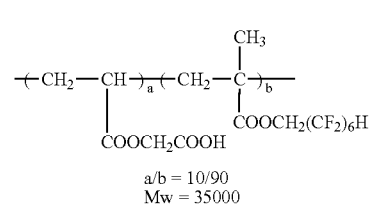
a/b = 10/90
Mw = 35000

P-7
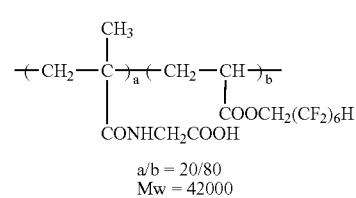
a/b = 20/80
Mw = 42000

-continued

P-8
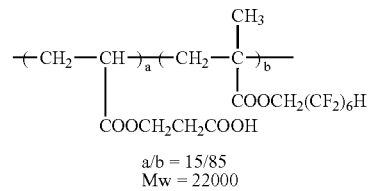
a/b = 15/85
Mw = 22000

P-9
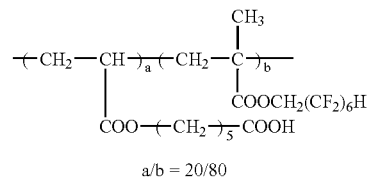
a/b = 20/80
Mw = 33000

P-10
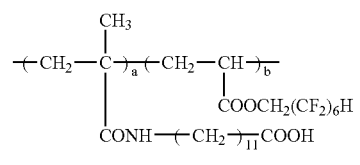
a/b = 10/90
Mw = 26000

P-11
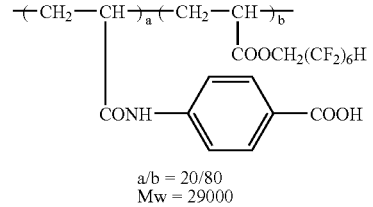
a/b = 20/80
Mw = 29000

P-12
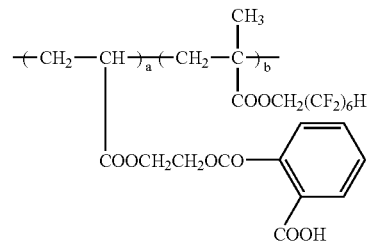
a/b = 15/85
Mw = 51000

P-13
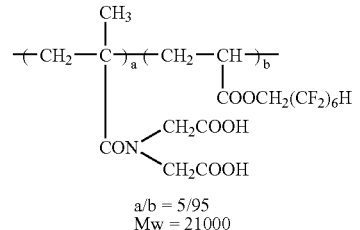
a/b = 5/95
Mw = 21000

P-14
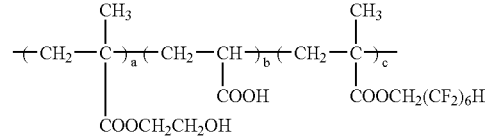
a/b/c = 30/5/65
Mw = 31000

-continued

P-15
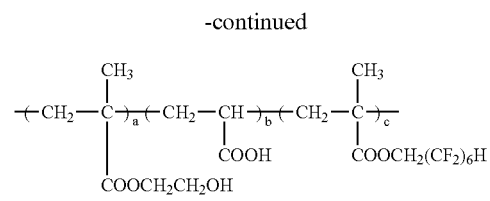
a/b/c = 15/5/80
Mw = 19000

P-16
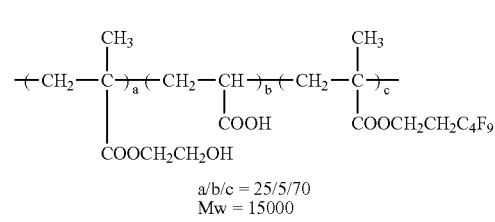
a/b/c = 25/5/70
Mw = 15000

P-17
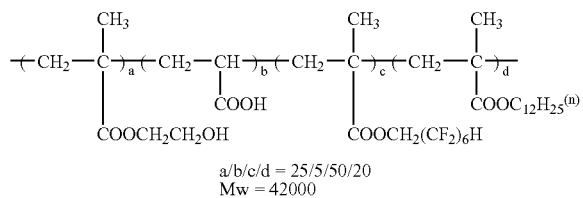
a/b/c/d = 25/5/50/20
Mw = 42000

P-18
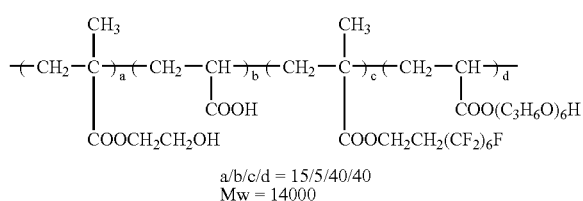
a/b/c/d = 15/5/40/40
Mw = 14000

P-19
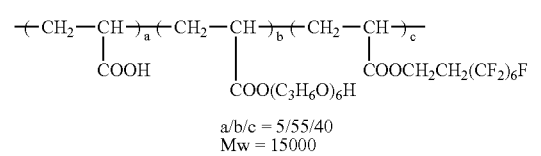
a/b/c = 5/55/40
Mw = 15000

P-20
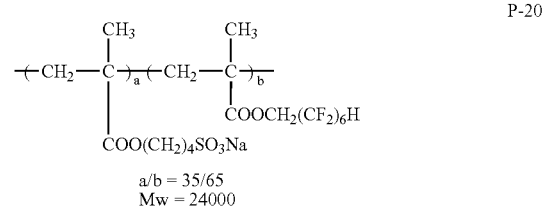
a/b = 35/65
Mw = 24000

P-21
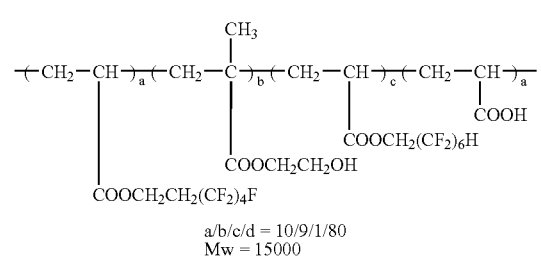
a/b/c/d = 10/9/1/80
Mw = 15000

-continued

P-22
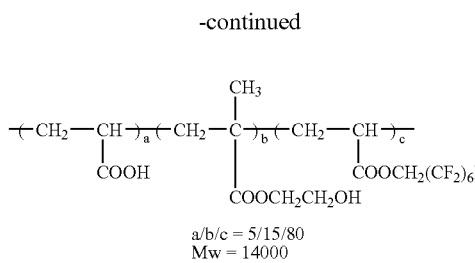
a/b/c = 5/15/80
Mw = 14000

P-23
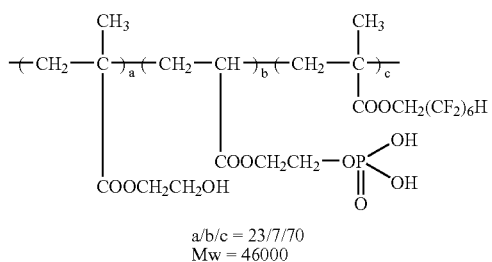
a/b/c = 23/7/70
Mw = 46000

P-24
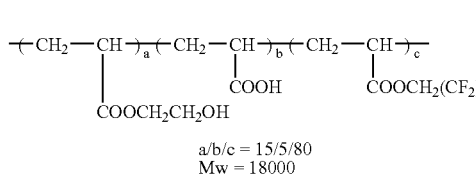
a/b/c = 15/5/80
Mw = 18000

P-25
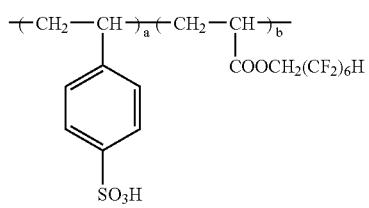
a/b = 10/90
Mw = 33000

P-26
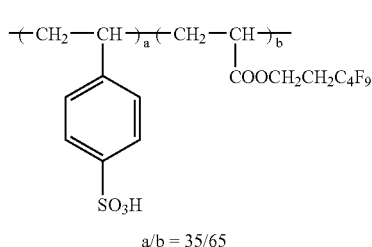
a/b = 35/65
Mw = 25000

The preferred amount of the fluoride-polymer in the composition may vary with its application, when the composition is used for production of an optically anisotropic layer, the amount of the fluoride-polymer is desirably from 0.005 to 8 wt %, more desirably from 0.01 to 5 wt % and much more desirably from 0.05 to 2.5 wt % with respect to the total weight of the composition (when the composition is a solution, the solvent is excluded). When the amount of the fluoride-polymer falls within the above scope, substantial effects may be obtained without lowering a drying property of the coating layer, and, thus, an optical film having uniform optical properties such as retardation.

Next, the fluoride-compound represented by the formula (2) will be described in detail.

<<Fluoride-Compound Represented by Formula (2)>>

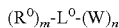 Formula (2)

wherein $R^0$ denotes an alkyl group, an alkyl group having a terminal $CF_3$ group, or an alkyl group having a terminal $CHF_2$ group; m denotes an integer greater than or equal to 1, where multiple occurrences of $R^0$ may be identical or different, with at least one denoting an alkyl group having a terminal $CF_3$ group or a terminal $CHF_2$ group; $L^0$ denotes a linking group of valence (m+n); W denotes a carboxyl group (—COOH) or a salt thereof, a sulfo group (—$SO_3H$) or a salt thereof, a sulfato group (—$OSO_3H$) or a salt thereof, or a phosphonoxy group {—OP(=O)(OH)$_2$} or a salt thereof; and n denotes an integer greater than or equal to 1.

In the formula (2), $R^0$ functions as the hydrophobic group. The alkyl group denoted by $R^0$ is optionally substituted, may have a straight chain or branching chain, desirably has from 1 to 20 carbon atoms, preferably has from 4 to 16 carbon atoms, and more preferably has from 6 to 16 carbon atoms. Any of the substituents given as examples for substituent selected from the Substituent Group D further below may be employed as substituents therein.

The alkyl group having a terminal $CF_3$ group denoted by $R^0$ desirably has from 1 to 20 carbon atoms, preferably from 4 to 16 carbon atoms, and more preferably from 4 to 8 carbon atoms. The alkyl group having a terminal $CF_3$ group is an alkyl group in which part or all of the hydrogen atoms have been substituted with fluorine atoms. At least 50 percent of the hydrogen atoms in the alkyl group are desirably substituted with fluorine atoms, with at least 60 percent substitution being preferred and at least 70 percent substitution being of even greater preference. The remaining hydrogen atoms may be further substituted with the substituents given as examples of substituent selected from the Substituent Group D further below.

The alkyl group having a terminal $CHF_2$ group denoted by $R^0$ desirably has from 1 to 20 carbon atoms, preferably from 4 to 16 carbon atoms, and more preferably from 4 to 8 carbon atoms. In the alkyl group having a terminal $CHF_2$ group denoted by $R^0$, at least 50 percent of the hydrogen atoms in the alkyl group are desirably substituted with fluorine atoms, with 60 percent or more substitution being preferred and 70 percent or more substitution being of even greater preference. The remaining hydrogen atoms may be further substituted with the substituents given as examples of substituent selected from the Substituent Group D further below.

Examples are given below of the alkyl group having a terminal $CF_3$ group denoted by $R^0$ and the alkyl group having a terminal $CHF_2$.

R1: n-$C_8F_{17}$—
R2: n-$C_6F_{13}$—
R3: n-$C_4F_9$—
R4: n-$C_8F_{17}$—(CH$_2$)$_2$—
R5: n-$C_6F_{13}$—(CH$_2$)$_2$—
R6: n-$C_4F_9$—(CH$_2$)$_2$—
R7: H—(CF$_2$)$_8$—
R8: H—(CF$_2$)$_6$—
R9: H—(CF$_2$)$_4$—
R10: H—(CF$_2$)$_8$—(CH$_2$)—
R11: H—(CF$_2$)$_6$—(CH$_2$)—
R12: H—(CF$_2$)$_4$—(CH$_2$)—

In the formula (2), the linking group of valence (m+n) denoted by $L^0$ is desirably a combination of at least two groups selected from the group consisting of alkylene groups, alkenylene groups, (m+n) valence aromatic groups, bivalent heterocyclic residues, —CO—, —NR— (where R denotes an alkyl group having from 1 to 5 carbon atoms or a hydrogen group), —O—, —S—, —SO—, and —$SO_2$—.

In formula (2), W denotes a carboxyl group (—COOH) or a salt thereof, a sulfo group (—$SO_3H$) or a salt thereof, a sulfato group (—$OSO_3H$) or a salt thereof, or a phosphonoxy group {—OP(=O)(OH)$_2$} or a salt thereof. The preferred scope of W is same as that of Q in the formula (1).

Among the compounds represented by the formula (2), the compounds represented by a formula (2a) or a formula (2b) described below are preferred.

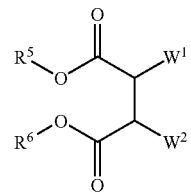

Formula (2a)

In the formula (2a), $R^5$ and $R^6$ respectively denote an alkyl group, an alkyl group having a terminal $CF_3$ group or an alkyl group having a terminal $CF_2$ group, and, however, they do not simultaneously denote alkyl groups. $W^1$ and $W^2$ respectively denote hydrogen atoms, a carboxyl group (—COOH) or a salt thereof, a sulfo group (—$SO_3H$) or a salt thereof, a sulfato group (—$OSO_3H$) or a salt thereof, a phosphonoxy group {—OP(=O)(OH)$_2$} or a salt thereof, or an alkyl group, an alkoxy group or an alkylamino group having a carboxyl group, a sulfo group, a sulfato group or a phosphonoxy group. However, $W^1$ and $W^2$ do not simultaneously denote hydrogen atoms.

$R^5$ and $R^6$ are identically defined with $R^0$ in the formula (2) above, and their preferred scopes are identical.

The carboxyl group (—COOH) or the salt thereof, the sulfo group (—$SO_3H$) or the salt thereof, the sulfato group (—$OSO_3H$) or the salt thereof or the phosphonoxy group {—OP(=O)(OH)$_2$} or the salt thereof denoted by $W^1$ and $W^2$ are identically defined with the hydrophilic groups denoted by W in the formula (2) above, and their preferred scopes are identical.

The alkyl groups having the hydrophilic group denoted by $W^1$ and $W^2$ may have straight or branching chains. They are desirably alkyl groups having from 1 to 20 carbon atoms, preferably alkyl groups having from 1 to 8 carbon atoms, and more preferably, alkyl groups having from 1 to 3 carbon atoms. The above-described alkyl group may have at least one hydrophilic group selected from a carboxyl group, a sulfo group, a sulfato group and a phosphonoxy group. The hydrophilic group is identically defined with the hydrophilic group denoted by W in the formula (2), and their preferred scopes are identical. The alkyl group having a hydrophilic group may be substituted with a substituent other than the hydrophilic group. Any of the substituents selected from the Substituent Group D further below may be employed as this substituent group.

The alkoxyl groups having the hydrophilic group denoted by $W^1$ and $W^2$ may have straight or branching chains. They are desirably alkoxyl groups having from 1 to 20 carbon atoms, preferably alkoxyl groups having from 1 to 8 carbon atoms, and more preferably, alkoxyl groups having from 1 to 4 carbon atoms. The above-described alkoxyl group may have at least one hydrophilic group selected from a carboxyl group, a sulfo group, a sulfato group and a phosphonoxy group. The hydrophilic group is identically defined with the hydrophilic group denoted by W in the formula (2), and their preferred scopes are identical. The alkoxyl group having a hydrophilic group may be substituted with a substituent other than the hydrophilic group. Any of the substituents selected from the Substituent Group D further below may be employed as this substituent group.

The alkylamino groups having the hydrophilic group denoted by $W^1$ and $W^2$ may have straight or branching chains. They are desirably alkylamino groups having from 1 to 20 carbon atoms, preferably alkylamino groups having from 1 to 8 carbon atoms, and more preferably, alkylamino groups having from 1 to 4 carbon atoms. The above-described alkylamino group may have at least one hydrophilic group selected from a carboxyl group, a sulfo group, a sulfato group and a phosphonoxy group. The hydrophilic group is identically defined with the hydrophilic group denoted by W in the formula (2), and their preferred scopes are identical. The alkylamino group having a hydrophilic group may be substituted with a substituent other than the hydrophilic group. Any of the substituents selected from the Substituent Group D further below may be employed as this substituent group.

It is particularly desirable for $W^1$ and $W^2$ to denote a hydrogen atom or $(CH_2)_nSO_3M$ (where n denotes 0 or 1). M denotes a cation, but when the charge in the molecule is 0, M may be absent. Examples of desirable cations denoted by M are alkali metal ions (lithium ions, sodium ions, potassium ions, and the like), alkaline earth metal ions (barium ions, calcium ions, and the like), and ammonium ions.

Next, the formula (2b) will be described in detail.

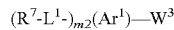

$(R^7-L^1-)_{m2}(Ar^1)-W^3$  Formula (2b)

In the formula (2b), $R^7$ denotes an alkyl group, an alkyl group having a terminal $CF_3$ group or an alkyl group having a terminal $CF_2H$ group; m2 denotes an integer greater than or equal to 1, where multiple occurrences of $R^7$ may be identical or different, with at least one denoting an alkyl group having a terminal $CF_3$ group or a terminal $CHF_2$ group; $L^1$ denotes a divalent linking group selected from the group consisting an alkylene group, an aromatic group, —CO—, —NR— (R denotes a $C_{1-5}$ alkyl group or a hydrogen atom), —O—, —S—, —SO—, —$SO_2$— and any combination thereof, where multiple occurrences of $L^1$ may be identical or different; $Ar^1$ represents an aromatic carbon ring residue or an aromatic hetero ring residue; and $W^3$ represents a carboxyl group (—COOH) or a salt thereof, a sulfo group (—$SO_3H$) or a salt thereof, a sulfato group (—$OSO_3H$) or a salt thereof, a phosphonoxy group {—OP(=O)(OH)$_2$} or a salt thereof, or an alkyl group, an alkoxy group or an alkylamino group having a carboxyl group, a sulfo group, a sulfato group or a phosphonoxy group.

$R^7$ is identically defined with $R^0$ in the formula (2) above, and their preferred scopes are identical.

$L^1$ is desirably a $C_{0-40}$ linking group selected from the group consisting of a $C_{1-12}$ alkyl group, a $C_{6-12}$ aromatic group, —CO—, —NR—, —O—, —S—, —SO—, —$SO_2$— and any combination thereof; and more desirably a $C_{0-20}$ linking group selected from the group a $C_{1-8}$ alkyl group, a phenyl group, —CO—, —NR—, —O—, —S—, —$SO_2$— and any combination thereof.

$Ar^1$ desirably represents a $C_{6-12}$ aromatic carbon ring residue, and more desirably a benzene ring residue or a naphthalene ring residue.

The carboxyl group (—COOH) or the salt thereof, the sulfo group (—$SO_3H$) or the salt thereof, the sulfato group (—$OSO_3H$) or the salt thereof or the phosphonoxy group {—OP(=O)(OH)$_2$} or the salt thereof denoted by $W^3$ are identically defined with the hydrophilic groups denoted by W in the formula (2) above, and their preferred scopes are identical. And the alkoxyl, alkoxy and alkylamino group having the hydrophilic group denoted by $W^3$ are identically defined with those denoted by $W^1$ or $W^2$; and their preferred scopes are identical.

$W^3$ is desirably selected from the group consisting of a carboxyl group (—COOH) and a salt thereof, a sulfo group (—$SO_3H$) and a salt thereof, an alkylamino group having a carboxyl group (—COOH) or a salt thereof and an alkylamino group having a sulfo group (—$SO_3H$) or a salt thereof; and more desirably selected from the group consisting of $SO_3M$ and $CO_2M$. M represents a cation, but when the charge in the molecule is 0, M may be absent. Examples of the cation denoted by M include a protonium ion, alkali metal ions (lithium ion, sodium ion, potassium ion and the like), alkaline earth metal ions (barium ions, calcium ions, and the like), and ammonium ions; and preferred example include a protonium ion, lithium ion, sodium ion, potassium ion and ammonium ion.

In the present Specification, Substituent Group D comprises alkyl groups (desirably alkyl groups having from 1 to 20 carbon atoms, preferably having from 1 to 12 carbon atoms, and more preferably having from 1 to 8 carbon atoms; examples are methyl, ethyl, isopropyl, tert-butyl, n-octyl, n-decyl, n-hexadecyl, cyclopropyl, cylopentyl, and cyclohexyl); alkenyl groups (desirably alkenyl groups having from 2 to 20 carbon atoms, preferably from 2 to 12 carbon atoms, and more preferably having from 2 to 8 carbon atoms; examples are vinyl, allyl, 2-butenyl, and 3-pentenyl); alkinyl groups (desirably alkinyl groups having from 2 to 20 carbon atoms, preferably from 2 to 12 carbon atoms, and more preferably from 2 to 8 carbon atoms; examples are propargyl and 3-pentinyl); aryl groups (desirably aryl groups having from 6 to 30 carbon atoms, preferably having from 6 to 20 carbon atoms, and more preferably having from 6 to 12 carbon atoms; examples are phenyl, p-methylphenyl, and naphthyl); optionally substituted amino groups (desirably amino groups having from 0 to 20 carbon atoms, preferably having from 0 to 10 carbon atoms, and more preferably having from 0 to 6 carbon atoms; examples are unsubstituted amino, methylamino, dimethylamino, diethylamino and dibenzylamino); alkoxy groups (desirably alkoxy groups having from 1 to 20 carbon atoms, preferably having from 1 to 12 carbon atoms, and more preferably having from 1 to 8 carbon atoms; examples are methoxy, ethoxy, and butoxy); aryloxy groups (desirably aryloxy groups having from 6 to 20 carbon atoms, preferably having from 6 to 16 carbon atoms, and more preferably having from 6 to 12 carbon atoms; examples are phenyloxy and 2-naphthyloxy), acyl groups (desirably acyl groups having from 1 to 20 carbon atoms, preferably having from 1 to 16 carbon atoms, and more preferably having from 1 to 12 carbon atoms; examples are acetyl, benzoyl, formyl, and pivaloyl); alkoxycarbonyl groups (desirably alkoxycarbonyl groups having from 2 to 20 carbon atoms, preferably having from 2 to 16 carbon atoms, and more preferably having from 2 to 12 carbon atoms; examples are methoxycarbonyl and ethoxy carbonyl); aryloxycarbonyl groups (desirably aryloxycarbonyl groups having from 7 to 20 carbon atoms, preferably having from 7 to 16 carbon atoms, and more preferably having from 7 to 10 carbon atoms; examples include phenyloxycarbonyl); acyloxy groups (desirably acyloxy groups having from 2 to 20 carbon atoms, preferably having from 2 to 16 carbon atoms, and more preferably having from 2 to 10 carbon atoms; examples are acetoxy and benzoyloxy); acylamino groups (desirably acylamino groups having from 2 to 20 carbon atoms, preferably having from 2 to 16 carbon atoms, and more preferably having from 2 to 10 carbon atoms; examples are acetylamino and benzoylamino); alkoxycarbonylamino groups (desirably alkoxycarbonylamino groups having from 2 to 20 carbon atoms, preferably having from 2 to 16 carbon atoms, and more preferably having from 2 to 12 carbon atoms; examples include methoxycarbonylamino); aryloxycarbonylamino groups (desirably aryloxycarbonylamino groups having from 7 to 20 carbon atoms, preferably having from 7 to 16 carbon atoms, and more preferably having from 7 to 12 carbon atoms; examples include phenyloxycarbonylamino); sulfonylamino groups (desirably sulfonylamino groups having from 1 to 20 carbon atoms, preferably having from 1 to 16 carbon atoms, and more preferably having from 1 to 12 carbon atoms; examples are methanesulfonylamino and benzenesulfonylamino), sulfamoyl groups (preferably sulfamoyl groups having from 0 to 20 carbon atoms, preferably having from 0 to 16 carbon atoms, and more preferably having from 0 to 12 carbon atoms; examples are sulfamoyl, methylsulfamoyl, dimethylsulfamoyl and phenylsulfamoyl); carbamoyl groups (desirably carbamoyl groups having from 1 to 20 carbon atoms, preferably having from 1 to 16 carbon atoms, and more preferably having from 1 to 12 carbon atoms; examples are unsubstituted carbamoyl, methylcarbamoyl, diethylcarbamoyl and phenylcarbamoyl); alkylthio groups (desirably alkylthio groups having from 1 to 20 carbon atoms, preferably having from 1 to 16 carbon atoms, and more preferably having from 1 to 12 carbon atoms; examples are methylthio and ethylthio), arylthio groups (desirably arylthio groups having from 6 to 20 carbon atoms, preferably having from 6 to 16 carbon atoms, and more preferably having from 6 to 12 carbon atoms; examples include phenylthio); sulfonyl groups (desirably sulfonyl groups having from 1 to 20 carbon atoms, preferably having from 1 to 16 carbon atoms, and more preferably having from 1 to 12 carbon atoms; examples are mesyl and tosyl); sulfinyl groups (desirably sulfinyl groups having-from 1 to 20 carbon atoms, preferably having from 1 to 16 carbon atoms, and more preferably having from 1 to 12 carbon atoms; examples are methanesulfinyl and benzenesulfinyl); ureido groups (desirably ureido groups having from 1 to 20 carbon atoms, preferably having from 1 to 16 carbon atoms, and more preferably having from 1 to 12 carbon atoms; examples are unsubstituted ureido, methylureido and phenylureido); phosphoramide groups (desirably phosphoramide groups having from 1 to 20 carbon atoms, preferably having from 1 to 16 carbon atoms, and more preferably having from 1 to 12 carbon atoms; examples are diethyl phosphoramide and phenyl phosphoramide); hydroxy, mercapto, halogen atoms (for example, fluorine, chlorine, bromine and iodine); cyano, sulfo, carboxyl, nitro, hydroxamic acid groups, sulfino, hydrazino, imino, heterocyclic groups (desirably heterocyclic groups having from 1 to 30 carbon atoms, preferably having from 1 to 12 carbon atoms; examples are heterocyclic groups having hetero atoms such as nitrogen, oxygen, and sulfur; examples are imidazolyl, pyridyl, quinolyl, furyl, piperidyl, morpholino, benzooxazolyl, benzimidazolyl, and benzthioazolyl); and silyl groups (desirably silyl groups having from 3 to 40 carbon atoms, preferably having from 3 to 30 carbon atoms, and more preferably having from 3 to 24 carbon atoms; examples are trimethylsilyl and triphenylsilyl). These substituents may be further substituted with these substituents. Further, when there are two or more substituents, they may be identical or different. When possible, they may be bonded together to form a ring.

As described above, in order to fix alignments of molecules liquid-crystal compounds, especially discotic liquid-crystal compounds, the fluoride-compound desirably has a polymerizable group as a substituent.

Specific examples of the fluoride-compound denoted by the formula (2) are given below. However, compounds that can be employed in the present invention are not limited to these compounds. Among the specific examples below, Nos. I-1 to 42 are examples of compounds denoted by the formula (2a); and Nos. I-43 to 66 are examples of compounds denoted by the formula (2b).

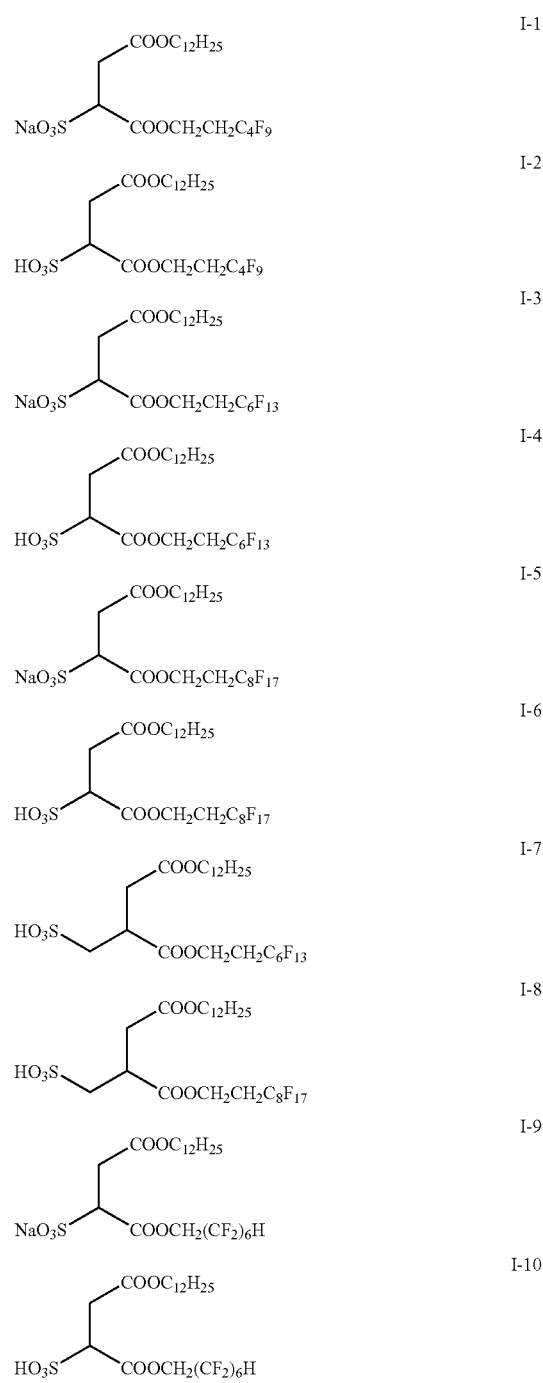

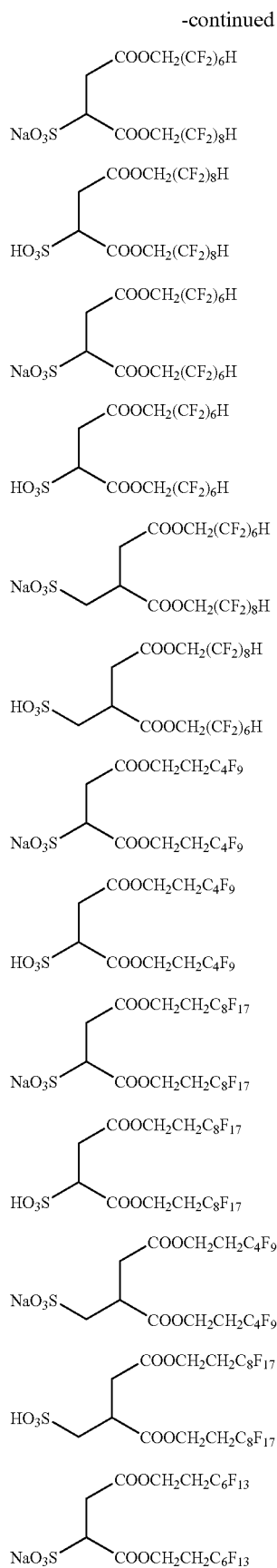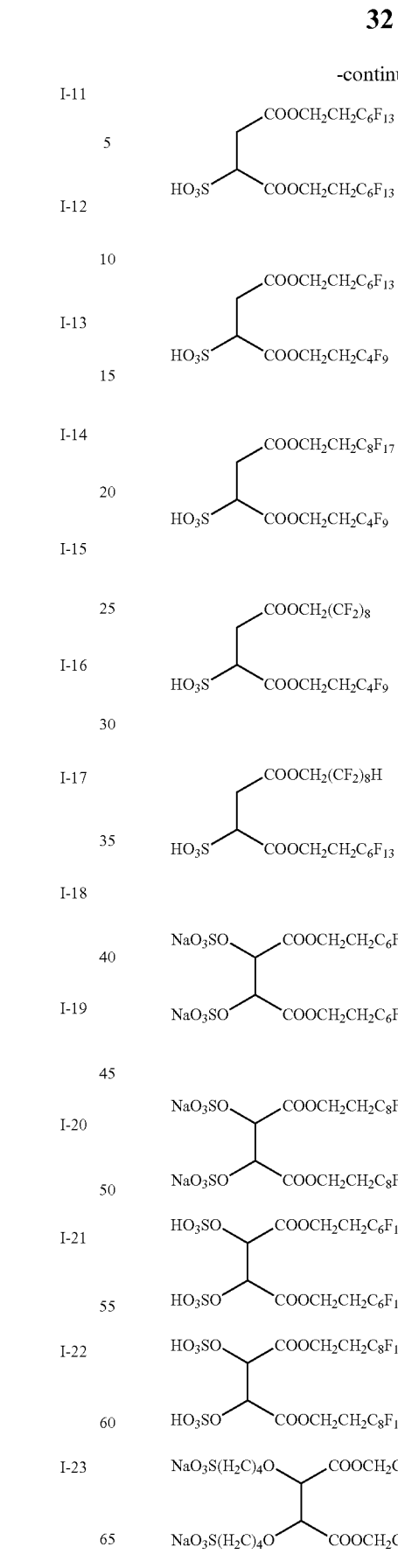

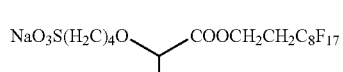
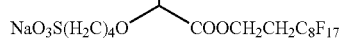
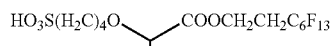
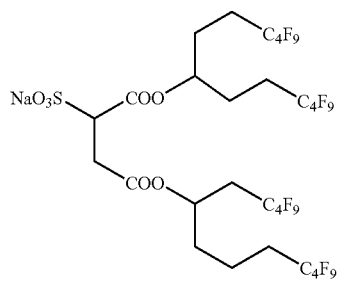
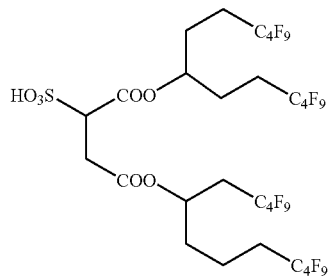
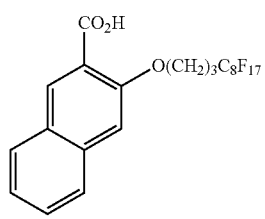
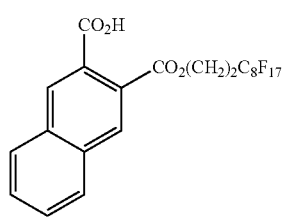
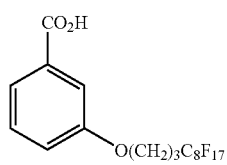
I-34
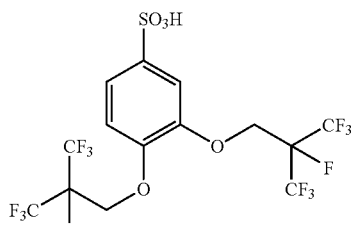 I-42
I-35
I-36
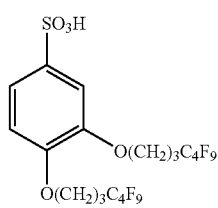 I-43
I-37
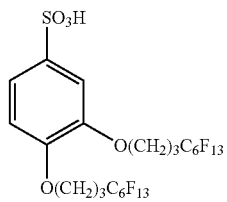 I-44
I-38
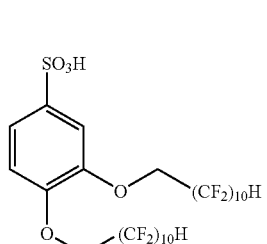 I-45
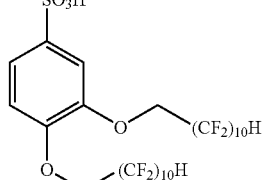
I-39
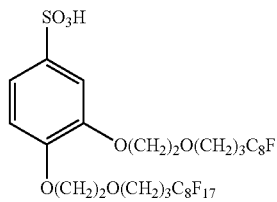 I-46
I-40
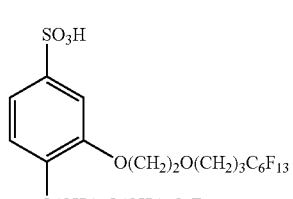 I-47
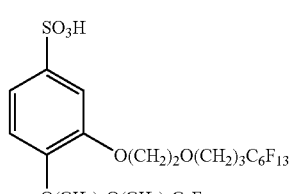
I-41
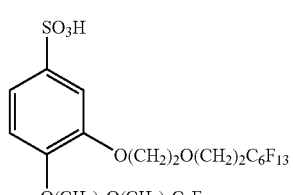 I-48

-continued
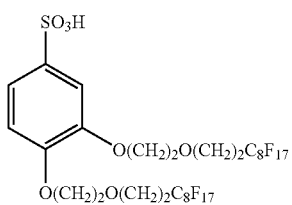
I-49
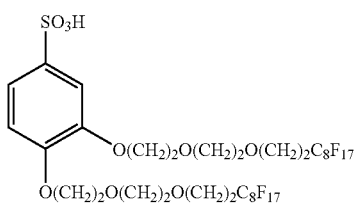
I-50
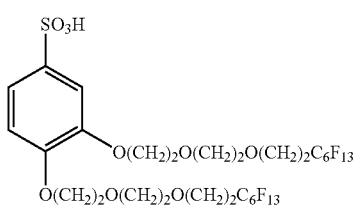
I-51
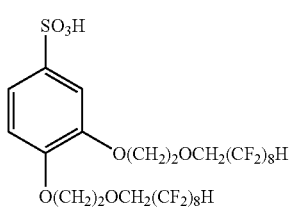
I-52
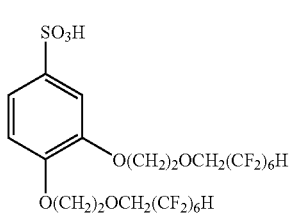
I-53
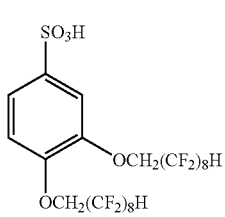
I-54
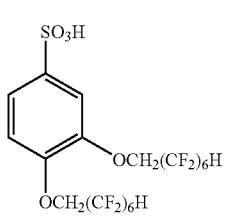
I-55
-continued
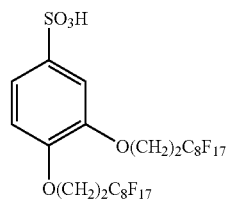
I-56
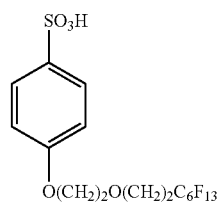
I-57
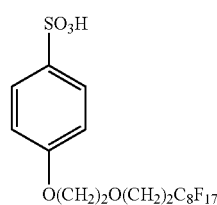
I-58
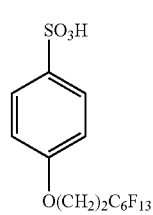
I-59
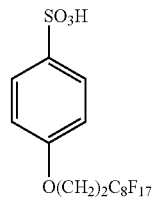
I-60
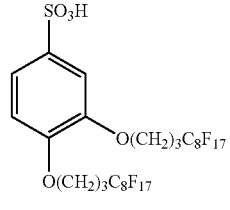
I-61
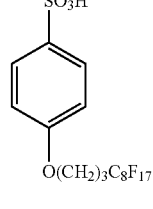
I-62

The preferred amount of the fluoride-compound in the composition may vary with its application, when the composition is used for production of an optically anisotropic layer, the amount of the fluoride-compound is desirably from 0.005 to 8 wt %, more desirably from 0.01 to 5 wt % and much more desirably from 0.05 to 1 wt % with respect to the total weight of the composition (when the composition is a solution, the solvent is excluded).

Next, the onium salt which can be used in the present invention will be described in detail.

(Onium Salt: Agent for Vertical-Alignment at Alignment-Layer-Interface)

The composition of the present invention comprises at least one onium salt. The onium salt may function as an agent for vertical-alignment at alignment-layer-interface in the composition. Examples of the onium salt include ammonium salts, sulfonium salts and phosphonium salts. The onium salt is desirably selected from quaternary onium salts, and more desirably selected from quaternary ammonium salts.

The quaternary ammonium salts are usually prepared by alkylation (Menshutkin reaction), alkenylation, alkynylation or arylation of tertiary ammonium salts such as trimethylamine, triethylamine, tributylamine, triethanolamine, N-methylpyrrolidine, N-methylpiperidine, N,N-dimethylpiperazine, triethylenediamine or N,N,N',N'-tetramethyl ethylenediamine; or nitrogen-containing heterorings such as pyridine ring, picoline ring, 2,2'-bipiridine ring, 4,4'-bipyridile ring, 1,10-pnenanthoroline ring, quinoline ring, oxazole ring, thiazole ring, N-methylimidazole ring, pyrazine ring or tetrazole ring.

The quaternary ammonium salt is desirably selected from quaternary ammonium salts of nitrogen-containing hetero rings, and more desirably selected from quaternary pyridinium salts.

The quaternary ammonium salt is desirably selected from the group represented by a formula (3a) or a formula (3b).

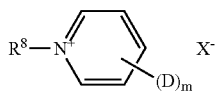

Formula (3a)

In the formula (3a), $R^8$ represents a substituted or non-substituted, alkyl group, alkenyl group, alkynyl group, aralkyl group, aryl group or heteroring group; D represents a group capable of hydrogen bonding; m represents an integer from 1 to 3; and $X^-$ represents an anion.

The alkyl group represented by $R^8$ is desirably selected from substituted or non-substituted $C_{1-18}$ alkyl groups, and more desirably selected from substituted or non-substituted $C_{1-8}$ alkyl groups. The alkyl group may have a linear chain, branched chain or cyclic structure. Examples of the alkyl group include methyl, ethyl, n-propyl, isopropyl, n-butyl, isobutyl, t-butyl, n-hexyl, n-octyl, neopentyl, cyclohexyl, adamantyl and cyclopropyl.

The alkyl group may be substituted with at least one substituent. Examples of the substituent include a substituted or non-substituted $C_{2-18}$, desirably $C_{2-8}$, alkenyl group such as vinyl; a substituted or non-substituted $C_{2-18}$, desirably $C_{2-8}$, alkynyl group such as ethynyl; a substituted or non-substituted $C_{6-10}$ aryl group such as phenyl or naphthyl; a halogen atom such as F, Cl or Br; substituted or non-substituted $C_{1-18}$, desirably $C_{1-8}$, alkoxy group such as methoxy or ethoxy; a substituted or non-substituted $C_{6-10}$ aryloxy group such as phenoxy, biphenyloxy or p-methoxyphenoxy; a substituted or non-substituted $C_{1-18}$, desirably $C_{1-8}$, alkylthio group such as methylthio or ethylthio; a substituted or non-substituted $C_{6-10}$ arylthio group such as phenylthio; a substituted or non-substituted $C_{2-18}$, desirably $C_{2-8}$, acyl group such as acetyl or propionyl; a substituted or non-substituted $C_{1-18}$, desirably $C_{1-8}$, alkylsulfonyl or arylsulfonyl group such as methanesulfonyl or p-toluene sulfonyl; a substituted or non-substituted $C_{2-18}$, desirably $C_{2-8}$, acyloxy group such as acetoxy or propionyl oxy; a substituted or non-substituted $C_{2-18}$, desirably $C_{2-8}$, alkoxycarbonyl group such as methoxycarbonyl or ethoxycarbonyl; a substituted or non-substituted $C_{7-11}$ aryloxycarbonyl group such as naphthoxy carbonyl; a non-substituted amino group; a substituted $C_{1-18}$, desirably $C_{1-8}$, amino group such as methylamino, dimethylamino, diethylamino, anilino, methoxyphenyl amino, chlorophenyl amino, pyridyl amino, methoxycarbonylamino, n-butoxycarbonyl amino, phenoxycarbonyl amino, methylcarbamoyl amino, ethylthiocarbamoyl, amino, phenylcarbamoyl amino, acetylamino, ethylcarbonyl amino, ethylcarbamoyl amino, cyclohexylcarbonyl amino, benzoylamino, chloro acetylamino or methylsulfonyl amino; a substituted or non-substituted $C_{1-18}$, desirably $C_{1-8}$, carbamoyl group such as non-substituted carbamoyl, methylcarbamoyl, ethylcarbamoyl, n-butylcarbamoyl, t-butylcarbamoyl, dimethylcarbamoyl, morpholino carbamoyl or pyrrolidino carbamoyl; a non-substituted sulfamoyl group; a substituted $C_{1-18}$, desirably $C_{1-8}$, sulfamoyl group such as methylsulfamoyl or phenylsulfamoyl; a cyano group, a nitro group, a carboxyl group, a hydroxy group, a heteroring group such as an oxazole ring, benzoxazole ring, thiazole ring, benzothiazole ring, imidazole ring, benzoimidazole ring, indolenine ring, pyridine ring, piperidine ring, pyrrolidine ring, morpholine ring, sulfolane ring, furan ring, thiophene ring, pyrazole ring, pyrrole ring, chroman ring or coumarin ring. The substituent for the alkyl group is much desirably selected from aryloxy groups, arylthio groups, arylsulfonyl group and aryloxycarbonyl groups.

The alkenyl group represented by $R^8$ is desirably selected from substituted or non-substituted $C_{2-18}$ alkenyl groups, and more desirably selected from substituted or non-substituted $C_{2-8}$ alkenyl groups. Examples of the alkenyl group include vinyl, allyl, 1-propenyl and 1,3-butadiene. Examples of the substituent for the alkenyl group are same as those for the alkyl group.

The alkynyl group represented by $R^8$ is desirably selected from substituted or non-substituted $C_{2-18}$ alkynyl groups, and more desirably selected from substituted or non-substituted $C_{2-8}$ alkynyl groups. Examples of the alkynyl group include ethynyl and 2-propynyl. Examples of the substituent for the alkynyl group are same as those for the alkyl group.

The aralkyl group represented by $R^8$ is desirably selected from substituted or non-substituted $C_{7-18}$ aralkyl groups. Examples of the aralkyl group include benzyl, methylbenzyl, biphenyl methyl and naphthyl methyl. Examples of the substituent for the aralkyl group are same as those for the alkyl group.

The aryl group represented by $R^8$ is desirably selected from substituted or non-substituted $C_{6-18}$ aryl groups. Examples of the aryl group include phenyl, naphthyl or fluorenyl. Examples of the substituent for the aryl group are same as those for the alkyl group. Other preferred examples of the substituent for the aryl group include alkyl groups such as methyl or ethyl, alkynyl groups and benzoyl groups.

The heterering group represented by $R^8$ is desirably selected from saturated or non-saturated 5- or 6-members heteroring groups, composed of a carbon, nitrogen, oxygen or sulfur atom. Exampled of the heteroring group include an oxazole ring, a benzoxazole ring, thiazole ring, benzothiazole ring, imidazole ring, benzoimidazole ring, indolenine ring, pyridine ring, piperidine ring, pyrrolidine ring, morpholine ring, sulfolane ring, furan ring, thiophene ring, pyrazole ring, pyrrole ring, chroman ring or coumarin ring. Examples of the substituent for the heteroring group are same as those for the alkyl group. The heteroring group is more desirably a benzoxazole ring or a benzothiazole ring.

It is preferred that $R^8$ is a substituted or non-substituted alkyl group, aralkyl group, aryl group or heteroring group.

D represents a group capable of hydrogen-bonding. Hydrogen bonds occur in molecules that have hydrogen atoms bound to electronic negative atoms such as O, N, F and Cl. For example, theoretical explanation of hydrogen bond is described in "Journal of American Chemical Society, vol. 99, p.1316~1332(1977), H. Uneyama and K. Morokuma". The specific types of hydrogen bonds are described in FIG. 17 on page 98 of "Intermolecular and Surface Forces" written by Israelachvili, translated by T. Kondo and H. Ohshima and published by McGraw-Hill. Specific examples of hydrogen bonds are described in "Angewante Chemistry International Edition English, vol. 34, p. 2311 (1995), G. R. Desiraju" and the like.

Preferred examples of the function group capable of hydrogen bonding include mercapto, hydroxy, amino, carboxamide, sulfonamide, acid amide, ureido, acyl group, carbamoyl, carboxyl, sulfo and N-containing heterocyclic group such as imidazolyl, benzimidazolyl, pyrazolyl, pyridyl, 1,3,5, -triazyl, pyrimidyl, pyridazil, quinolyl, benzimidazolyl, benzothiazolyl, succinimido, phthalimido, maleimide, uracil, thicuracil, barbituric acid, hydantoin, maleic acid hydrazide, isatine and uramil. More preferred examples of the function group capable of hydrogen bonding include amino, carbonamide, sulfonamide, ureido, carbamoyl, carboxyl, sulfo and pyridyl, and much more preferred examples include amino, carbamoyl and pyridyl.

The anion represented by $X^-$ may be selected from inorganic or organic anions. Examples of the anion include halogen anions such as fluorine ion, chlorine ion, bromine ion or iodine ion; sulfonate ions such as methanesulfonic acid ion, trifluoromethanesulfonic acid ion, methylsulfuric acid ion, p-toluene sulfonic acid ion, p-chloro benzenesulfonic acid ion, 1,3-benzenedisulfonic acid ion, 1,5-naphthalenedisulfonic acid ion or 2,6-nephthalenedisulfonic acid ion; sulfate ion, thiocyanic acid ion, perchloric acid ion, tetrafluoro boric acid, picric acid ion, acetic acid ion, phosphoric acid ion such as hexafluoro phosphoric acid ion and hydroxy ion. $X^-$ is desirably selected from a halogen anion, sulfonate ion and hydroxy ion. It is noted that $X^-$ is not required to be a monovalent anion. Thus, $X^-$ may be selected from two or more valent anions, and in such case, it is not required that the cation-to-anion ratio is 1.

In the formula (3a), m is desirably 1.

Next, the formula (3b) will be described in detail.

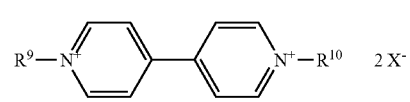

Formula (3b)

In the formula (3b), $R^9$ and $R^{10}$ respectively represent a substituted or non-substitute, alkyl group, alkenyl group, alkynyl group, aralkyl group, aryl group or heteroring group; and $X^-$ represents an anion.

The substituted or non-substituted, alkyl group, alkenyl group, alkynyl group, aralkyl group, aryl group or heteroring group is identically defined with those in the formula (3a) respectively, and their preferred scopes are also same. The anion represented by $X^-$ is identically defined with that in the formula (3a), and the preferred scope is also same. AS described above, $X^-$ is not required to be a monovalent anion. Thus, $X^-$ may be selected from two or more valent anions, and in such case, it is not required that the cation-to-anion ratio is ½.

Specific examples of the onium salt, which can be used in the present invention are shown below, and, however, onium salts that can be employed in the present invention are not limited to these. Among the examples, Example No.II-1~12 are examples of the onium salt represented by the formula (3b); and Examples No.II~13~32 are examples of the onium salt represented by the formula (3a).

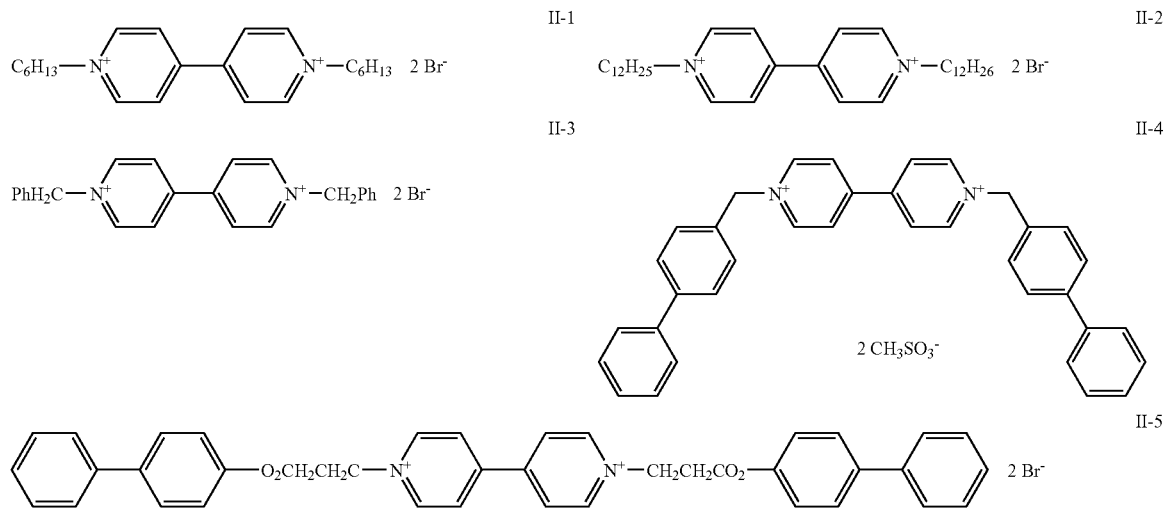

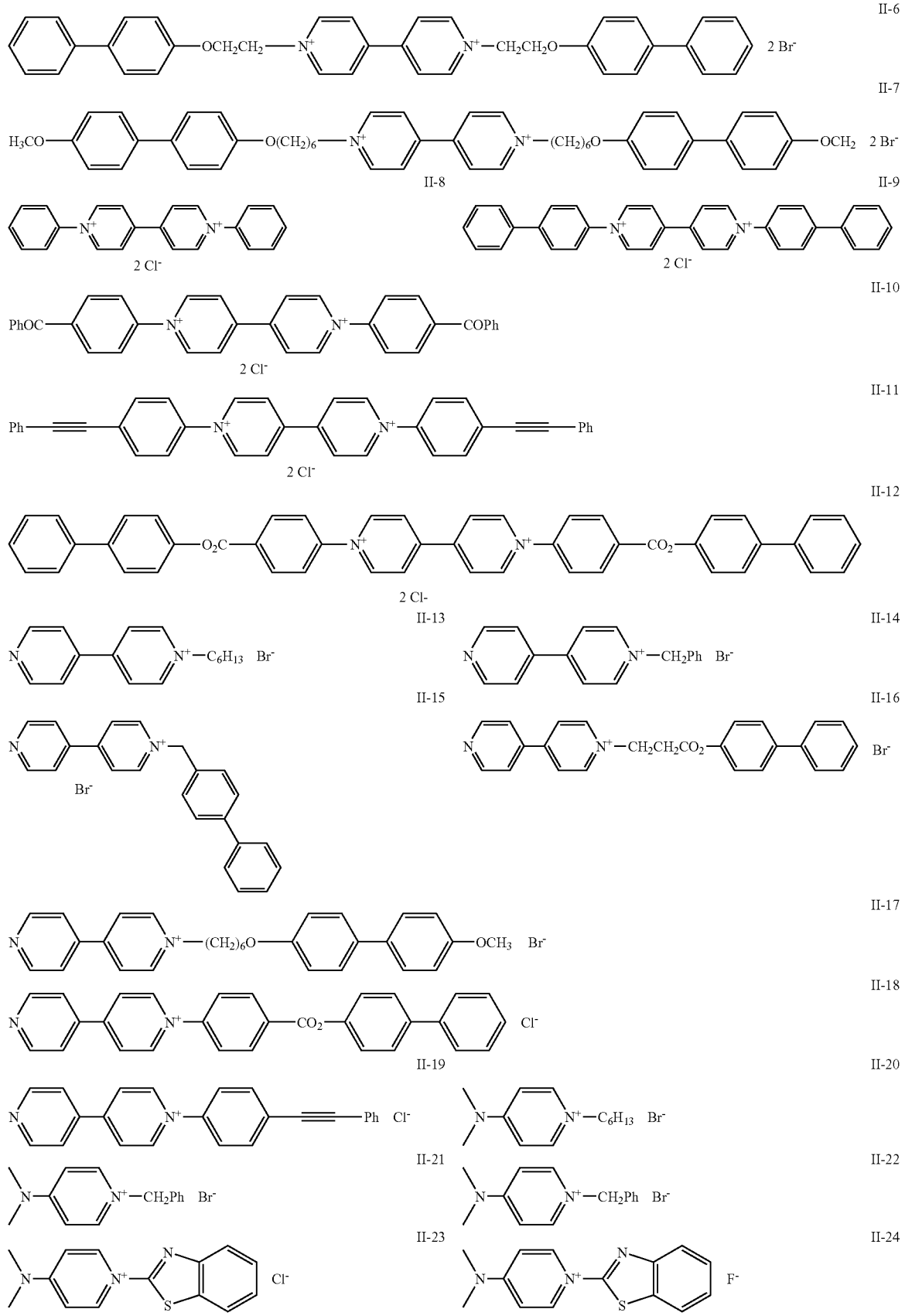

-continued

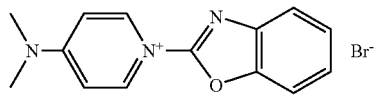

II-25

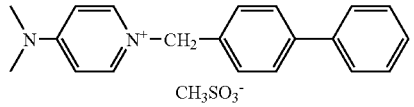

II-27

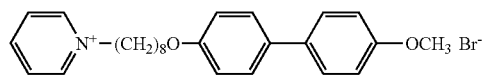

II-29

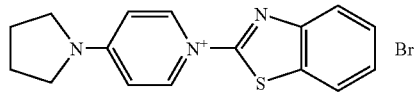

II-31

II-33

CH₃
|
H₃C—N⁺—CH₃   F⁻
|
CH₃

II-35

CH₃           CH₃
|             |
H₃C—N⁺—CH₂CH₂—N⁺—CH₃   2 Br⁻
|             |
CH₃           CH₃

II-37

Ph₃P⁺Me   Br⁻

II-26

II-28

II-30

II-32

II-34

CH₃
|
H₃C—N⁺—CH₃   OH⁻
|
CH₃

II-36

Ph              Ph
  |               |
Ph—P⁺—(CH₂)₄—P⁺—Ph   2 Br⁻
  |               |
  Ph              Ph

II-38

Ph₄P⁺Me   Br⁻

The preferred range of the amount of the onium salt in the composition may vary with its application, when the composition is used for production of an optically anisotropic layer, the amount of the onium salt is desirably from 0.005 to 8 wt %, more desirably from 0.01 to 5 wt % and much more desirably from 0.05 to 1 wt % with respect to the total weight of the composition (when the composition is a solution, the solvent is excluded).

(Liquid-Crystal Compound)

The composition of the present invention comprises at least one liquid-crystal compound. Discotic liquid-crystal molecules have been variously described in the literature (Mol. Crysr. Liq. Cryst., vol. 71, page 111 (1981), C. Destrade et al.; Quarterly Chemistry Survey, No. 22, The Chemistry of Liquid Crystals, Chapter 5, Chapter 10, Section 2 (1994), ed. by Japan Chem. Soc.; Angew. Chem. Soc. Chem. Comm., page 1794 (1985), B. Kohne et al.; J. Am. Chem. Soc., vol. 116, page 2,655 (1994), J. Zhang et al.). The polymerization of discotic liquid-crystal molecules is described in JP-A No. hei8-27284.

It is necessary to bond a polymerizable group as a substituent to the disk-shaped core of a discotic liquid-crystal molecule to better fix the discotic liquid-crystal molecules by polymerization. However, when a polymerizable group is directly bonded to the disk-shaped core, it tends to be difficult to maintain alignment during the polymerization reaction. Accordingly, the discotic liquid-crystal molecule desirably comprises a linking group between the disk-shaped core and the polymerizable group. That is, the discotic liquid-crystal molecule is desirably the compound denoted by a formula below.

$$D(-L-P)_n$$

In the formula, D represents a discotic core, L represents a divalent linking group, p represents a polymerizable group and n is an integer from 4 to 12. Specific examples of the discotic core (D), the linking group (L) and the polymerizable group (P) are (D1) to (D15), (L1) to (L25) and (P1) to (P18), described in JPA No. 2001-4837, respectively, and the descriptions about those in JPA No. 2001-4837 are used in the present invention.

The temperature at which the liquid-crystal compound transfers from a discotic nematic liquid-crystal state to a solid state is desirably from 70 to 300° C., and more desirably from 70 to 170° C.

(Polymerization Initiator)

The vertical-aligned discotic molecules are fixed in the alignment state. The discotic liquid-crystal molecules are desirably fixed by polymerization reaction of the polymerizable group (P). Polymerization reactions include thermal polymerization reactions employing a thermal polymerization initiator and photo-polymerization reactions employing a photo-polymerization initiator. A photo-polymerization reaction is preferred. Examples of photo-polymerization initiators are alpha-carbonyl compounds (described in U.S. Pat. Nos. 2,367,661 and 2,367,670), acyloin ether (described in U.S. Pat. No. 2,448,828), alpha-hydrocarbon-substituted aromatic acyloin compounds (described in U.S. Pat. No. 2,722,512), polynuclearquinone compounds (described in U.S. Pat. Nos. 3,046,127 and 2,951,758), combinations of triarylimidazole dimers and p-aminophenyl ketones (described in U.S. Pat. No. 3,549,367), acridine and phenadine compounds (described in JPA No. sho 60-105667 and U.S. Pat. No. 4,239,850), and oxadiazole compounds (described in U.S. Pat. No. 4,212,970).

The amount of photo-polymerization initiator employed is desirably from 0.01 to 20 weight percent, preferably from 0.5 to 5 weight percent, of the solid portion of the coating liquid. Irradiation for polymerization of discotic liquid-crystal molecules is desirably conducted with ultraviolet radiation. The irradiation energy is desirably from 20 mJ/cm$^2$ to 50 J/cm$^2$, preferably from 100 to 800 mJ/cm$^2$. Irradiation may be conducted under heated conditions to promote the photo-polymerization reaction.

(Other Additives)

The composition of the present invention may comprise other additives such as plasticizers, surfactants or polymerizable monomers, with the liquid-crystal compound. Such additives may contribute to improvement in uniformity of a coating layer, strength of a coating layer, alignment ability of liquid-crystal molecules or the like. Such additives are desirably selected from materials which can be mixed with the liquid-crystal compound compatibly and don't inhibit the alignment of the liquid-crystal compound.

The polymerizable monomer may be selected from radical-polymerizable or cation-polymerizable compounds, and desirably selected from radical-polymerizable compounds having a plural function group, and among them, the compounds which can copolymerize with the polymerizable liquid-crystal compound described above are preferred. Preferred examples of the polymerizable monomer include those described in the columns of [0018] to [0020] in JPA No. 2002-296423. In usual, the amount of the polymerizable monomer is desirably from 1 to 50 wt %, and more desirably from 5 to 30 wt %, with respect to the total weight of a single or plural liquid crystal compounds.

The surfactant may be selected from any known surfactants, and is desirably selected from fluoride-surfactants. More specifically, the compounds, described in the columns of [0028] to [0056] in JPA No. 2001-330725, and the compounds, described in the columns of [0069] to [0126] in JPA No. 2003-295212, are preferred.

Single or plural polymers may be used with the liquid crystal. The polymer is desirably selected from polymers which can increase a viscosity of a coating liquid. Examples of the polymer include cellulose esters. Preferred examples of cellulose ester include those described in the column [0178] in JPA No. 2000-155216. Avoiding inhibiting the alignment of the liquid-crystal compound, the amount of the polymer is desirably from 0.1 to 10 wt %, and more desirably from 0.1 to 8 wt %, with respect to the weight o.f the liquid-crystal compound.

[Preparation of an Optically Anisotropic Layer]

The composition of the present invention is useful for preparing an optically anisotropic layer having an anisotropy given by a vertical-alignment of liquid-crystal molecules, especially discotic liquid-crystal molecules. The optically anisotropic layer can be used in various applications. When the optically anisotropic layer is used in a liquid-crystal display, especially IPS mode liquid-crystal display, the layer can contribute to improvement of viewing angle. The optically anisotropic layer may be prepared by applying the composition of the present invention to a surface of an alignment layer. The composition of the present invention is desirably prepared as a coating liquid for easiness in coating. Solvents are used for preparing the coating liquid, and the solvent is desirably selected from organic solvents. Examples of the organic solvent include amides such as N,N-dimethylformamide, sulfoxides such as dimethyl sulfoxide, heterocyclic compounds such as pyridine, hydrocarbons such as benzene and hexane, alkyl halides such as chloroform and dichloromethane, esters such as methyl acetate and butyl acetate, ketones such as acetone and methyl ethyl ketone and ethers such as tetrahydrofuran and 1,2-dimethoxyethane. Alkyl halides and ketones are preferred. One or more kinds of solvents may be used for preparing the coating solutions.

The coating liquid can be applied by known techniques (e.g., extrusion coating, direct gravure coating, reverse gravure coating and die coating).

According to the present invention, the optically anisotropic layer desirably has a thickness of 0.1 to 10 micrometers, preferably of 0.5 to 5 micrometers, and more preferably of 1 to 5 micrometers.

(Alignment Layer)

For aligning (desirably hybrid-aligning) liquid crystal molecules in the optically anisotropic layer, an alignment layer is desirably used. However, according to the present invention, an alignment layer is not an essential element after fixing liquid-crystal molecules because the molecules fixed in an alignment state can keep the alignment without an alignment layer. Thus, after an optically anisotropic layer is formed on an alignment layer, only the optically anisotropic layer may be transferred from on the alignment layer to on another member such as a polarizing film, and in such case, the alignment layer is absent.

The alignment layer that can be employed in the present invention may be provided by rubbing a layer formed of an organic compound (preferably a polymer), oblique vapor deposition, the formation of a layer with microgrooves, or the deposition of organic compounds (for example, omega-tricosanoic acid, dioctadecylmethylammonium chloride, and methyl stearate) by the Langmuir-Blodgett (LB) film method. Further, alignment layers imparted with orientation functions by exposure to an electric or magnetic field or irradiation with light are also known.

The alignment layers formed by rubbing polymer layers are particularly desirable. The polymers for preparing the alignment layers may basically have a molecular structure capable of aligning discotic liquid-crystal molecules. According to the present invention, the polymer is desirably selected from polymers having such a molecular structure and further having a structural feature in which a main chain bounds to side chains containing a crosslinkable group (such as a double bonding); or polymers having a structural feature in which a main chain bounds to side chains containing a crosslinkable function group capable of aligning liquid-crystal molecules. The polymers may be selected from polymers capable crosslinking themselves or polymers to be crosslinked by any crosslinkable agent, and such polymers may be used in any combination.

Examples of the polymer used for preparing an alignment layer include methacrylate copolymers described in the column [0022] in JPA No. hei 8-338913, styrene copolymers, polyolefins, polyvinyl alcohols, modified polyvinyl alcohols, poly(N-methylol acrylamide), polyesters, polyimides, vinyl acetate copolymers, carboxymethylcelluloses and polycarbonates. Silane coupling agents are also used as a polymer. Water-solbule polymers such as poly(N-methylol acrylamide), carboxymethylcelluloses, gelatins, polyvinyl alcohols or modified polyvinyl alcohols are preferred; gelatins, polyvinyl alcohols and modified polyvinyl alcohols are more preferred; and polyvinyl alcohols and modified polyvinyl alcohols are much more preferred. Using plural polyvinyl alcohols or modified polyvinyl alcohols, they have a different polymerization degree each other, is especially preferred.

The saponification degree of the polyvinyl alcohol is desirably from 70 to 100%, and more desirably from 80 to 100%. The polymerization degree of the polyvinyl alcohol is desirably from 100 to 5000.

In usual, the side chain having a function capable of aligning discotic liquid-crystal molecules may have a hydrophobic group as a function group. The types of the function group may be decided depending on various factors such as types of the liquid-crystal compounds or desired alignment state. For example, the modified group can be introduced into the polyvinyl alcohol by copolymerization modification, chain-transfer modification or bloc-polymerization modification. Examples of the modified group include hydrophilic groups such as a carboxylic acid group, a sulfonic acid group, a phosphoric acid group, an amino group, an ammonium group, an amide group or a thiol group; $C_{10-100}$ hydrocarbon groups; hydrocarbon groups substituted with fluorine atoms; thioether groups, polymerizable groups such as an unsaturated polymerizable group, an epoxy group or an aziridile group; and alkoxysilyl groups such as tri-, di- or mono-alkoxysilyl group. Specific examples of such modified polyvinyl alcohols include those described in the columns [0022] to [0145] in JPA No. 2000-155216 and those described in the columns [0018] to [0022] in JPA No. 2002-62426.

It is possible to copolymerize a polymer in an alignment layer and a multi-functional monomer in an optically anisotropic layer, when the polymer in the alignment layer has a main chain bonding to side chains containing a crosslinkable functional group, or the polymer in the alignment layer has side chain being capable of aligning liquid-crystal molecules and containing a crosslinkable functional group. In such case, not only between the multi-functional monomers but also between the polymers in the alignment layer and the multi-functional monomers and the polymers in the alignment layer, the covalent bondings are formed and the bonding strengths are improved. Thus, in such case, the strength of the optical compensatory film can be remarkably improved.

The polymer in the alignment layer desirably has crosslinkable functional group containing a polymerizable group. Specific examples include those described in the columns of [0080] to [0100] in JPA No. 2000-155216.

The polymer in the alignment layer may be crosslinked by a crosslinkable agent. Examples of the crosslinkable agent include aldehydes, N-methylol compounds, dioxane derivatives, compounds to act when being activated their carboxyl groups, active vinyl compounds, active halogen compounds, isoxazoles and dialdehyde starches. Single or plural type of crosslinkable agents may be used. Specific examples of the crosslinkable agent include the compounds described in the columns [0023] to [0024] in JPA No. 2002-62426. Aldehydes having a high reaction-activity are preferred, and glutaraldehydes are more preferred.

The amount of the crosslinkable agent is desirable from 0.1 to 20 wt %, and more desirably 0.5 to 15 wt %, with respect to the weight of the polymer., The residual amount of the unreacted crosslinkable-agent in the alignment layer is desirably not greater than 1.0 wt %, and more desirably not greater than 0.5 wt %. When the residual amount falls with in the range, the alignment layer has a sufficient durability, and even if the alignment is used in a liquid-crystal display for a long time, or is left under a high temperature and humidity atmosphere for a long time, no reticulation is appeared in the alignment layer.

The alignment layer may be prepared by applying a coating liquid, containing the above polymer, and, if necessary, the corsslinkable agent, to a surface of a transparent substrate, drying under heating (crosslinking), and performing a rubbing treatment. The crosslinking reaction may be carried out anytime after applying the coating liquid. When a hydrophilic polymer such as polyvinyl alcohol is used for preparation of an alignment layer, the coating liquid is desirably prepared using a mixed solvent of an organic solvent such as methanol, exhibiting a deforming function, and water. The weight ratio of water to methanol is desirably from 0/100 to 99/1, and more desirably from 0/100 to 91/9. Using such a mixed solvent can prevent bubbles from generating, and can remarkably reduce defects in the surface of the alignment layer and the optically anisotropic layer.

The coating liquid may be applied by any known method such as a spin-coating method, a dip coating method, a curtain coating method, extrusion coating method, rod coating method, or roll coating method. The rod coating method is especially preferred. The thickness of the alignment layer after being dried is desirably from 0.1 to 10 micrometers. Drying may be carried out at 20 to 110° C. In order to form sufficient crosslinking, drying is desirably carried out at 60 to 100° C., and more desirably at 80 to 100° C. The drying may be continued for 1 minute to 36 hours, and desirably for 1 minute to 30 minutes. The pH is desirably set in a proper range for a crosslinkable agent to be used, and when glutaraldehyde is used, the pH is desirably set in a range from 4.5 to 5.5, and more desirably 5.

The alignment layer may be formed on a transparent substrate. The alignment layer can be obtained by applying a rubbing treatment to the surface of the polymer layer after crosslinking the polymer layer.

The rubbing treatment may be carried out according to any known treatment used in a liquid-crystal alignment step of LCD. For example, the rubbing treatment may be carried out by rubbing the surface of a polymer layer with a paper, a gauze, a felt, a rubber, a nylon fiber, polyester fiber or the like in a direction. Usually, the rubbing treatment may be carried out by rubbing a polymer layer with a fabric in which fibers having a uniform length and line thickness are implanted averagely at several times.

Next, the liquid-crystal molecules are aligned on the alignment layer. After that, if necessary, the reaction between the polymers in the alignment layer and the multi-functional monomers in the optical compensatory film may be carried out, or the crosslinking reaction of the polymers in the alignment layer with a crosslinkabkle agent may be carried out. The thickness of the alignment layer is desirably from o.1 to 10 micrometers.

(Substrate)

According to the present invention, a substrate supporting the optically anisotropic layer may be used. The substrate is preferably transparent, and, in particular, preferably has a light transmission of not less than 80%. The substrate is preferably selected from polymer films having a small wavelength-dependence, and, in particular, preferably has a Re400/Re700 ratio of less than 1.2. The substrate is also preferably selected from films formed of optically isotropic polymers, and, in particular, preferably has an in-plane retardation (Re) of not greater than 20 nm and more preferably not greater than 10 nm. Examples of materials for the substrate, however not limited to them, include cellulose esters, polycarbonates, polysulfones, polyethersulfones, polyacrylates and polymethacrylates. Among these, cellulose esters are preferred, acetyl celluloses are more preferred and triacetyl celluloses are much more preferred. The thickness of the substrate is desirably from 20 to 500 micrometers, and more desirably from 50 to 200 micrometers.

In order to improve adhesion between the substrate and a layer formed thereon (for example, an adhesion layer, a vertical alignment layer or a retardation layer), the polymer film may be subjected to surface treatment. Examples of surface treatments include corona discharge treatment, glow discharge treatment, flame treatment, acid treatment, alkali treatment and UV irradiation treatment. An adhesion layer (an undercoating layer) may be formed on the substrate. A polymer layer containing inorganic particles having an average particle diameter of 10 to 100 nm in an amount of 5 wt % to 40 wt % with respect to the total weight of all solid ingredients is desirably formed on one side of the substrate, especially a long substrate, by coating or co-flow casting method, in order to improve a slide ability of the substrate in a feeding step or to prevent an adhesion of the surface to the rear surface of the substrate after being rolled up.

(Optical Compensatory Film)

The optical compensatory film of the present invention comprises an optically anisotropic layer having an air-interface and an alignment-layer-interface, and the optically anisotropic layer comprises at least one liquid-crystal compound, at least one compound capable of increasing or decreasing a tilt angle of the liquid-crystal compound at the air-interface and at least one compound capable of increasing or decreasing a tilt angle of the liquid-crystal compound at the alignment-layer-interface. In the Specification, "compound capable of increasing or decreasing a tilt angle of the liquid-crystal compound at the air-interface" means any compound capable of changing a tilt angle of liquid-crystal molecules present near to the air-interface by 10 to 40° when being used with the liquid-crystal compound. And in the Specification, "compound capable of increasing or decreasing a tilt angle of the liquid-crystal compound at the alignment-layer-interface" means any compound capable of changing a tilt angle of liquid-crystal molecules present near to the alignment-layer-interface by 10 to 90° when being used with the liquid-crystal compound. The tilt angle is measured for an optical compensatory film which is prepared by applying a coating liquid comprising a discotic liquid-crystal compound (for example a compound used in Example 1 described later) to an alignment layer formed on a transparent substrate in the same manner as Example 1 described later, drying, heating up to a liquid-crystal-formed temperature, cooling down without disordering the alignment and polymerizing. The variation of the tilt angle can be decided as a difference between the tilt angles found in the optical compensatory film comprising an agent for a vertical alignment and found in the optical compensatory film not comprising any agent for a vertical alignment. The measurement wavelength is set 632.8 nm.

It is difficult to measure θ1, which is a tilt angle of discotic or rod-like molecules at an interface of an optically anisotropic layer, and θ2, which is a tilt angle of discotic or rod-like molecules at another interface of the optically anisotropic layer, directly and exactly, and, therefore, in the present invention, for ease in working out, the values which are calculated with two assumptions described below are used as the θ1 and θ2. Although this method doesn't express an actual alignment state exactly, it is effective as a method which can express relatively some optical properties of the optical film.

Assumption 1:

It is assumed that an optically anisotropic layer is a multilayer structure in which each layer comprises aligned liquid-crystalline molecules such as discotic liquid-crystalline molecules, rod-like molecules or the like, and that a layer of a minimum unit (it is assumed that the tilt angle of liquid-crystalline molecules in each minimum-unit layer is a uniform value) is optically uniaxial.

Assumption 2:

It is assumed that the tilt angle in each minimum-unit layer varies monotonically as a linear function of a distance in a thickness-direction.

The practical method is as follows:

(1) Each layer, in which the tilt angle varies monotonically as a linear function of a distance in a thickness-direction, is irradiated with light entering at various light incident angles to measure retardations at more than three measurement angles. For ease in measurement and calculation, retardations are preferably measured at three measurement angles of −40°, 0° and +40° when the normal line direction of the optically anisotropic layer is set to 0°. Such measurements can be carried out by using KOBRA-21ADH and KOBRA-WR manufactured by Oji Scientific Instruments, Transmissive Elipsometer AEP-100 manufactured by Shimazu Corporation, M150 and M520 measured by JASCO Corporation, ABR10A manufactured by Uniopt Corporation, Ltd. or the like.

(2) In the model described above, a refraction index of the each layer for ordinary light is defined as "$n_o$", a refraction index of the each layer for extraordinary light is defined as "$n_e$", where "$n_e$"s of the minimum unit layers are same each other as well as "$n_o$"s, and a whole thickness of the multilayer structure is defined as "d". And, on the assumption that the tilting direction and an optical axis direction in each layer are identical to each other, fitting is carried out by using a tilt angle at one interface of the optically anisotropic layer, θ1, and a tilt angle at another interface of the optically anisotropic layer, θ2, as a parameter such that the angle-dependence of the calculated retardation values is in reasonable agreement with the measured values, and, as a result, θ1 and θ2 are calculated.

The $n_o$'s and $n_e$'s of various materials are described in published documents and catalogs, and such values can be used in the above method. If the values are unknown, the values may be measured with an abbe refractometer or the like. The thickness of an optically anisotropic layer can be measured with an optical interference film thickness meter, sectional photographs taken by a scanning microscope or the like. It is noted that the measurement wavelength is 632.8 nm.

The amount of the compound capable of increasing or decreasing a tilt angle is desirably from 0.005 to 8 wt %, more desirably from 0.01 to 5 wt % and much more desirably from 0.05 to 1 wt % with respect to the total weight of the composition (when the composition is a solution, the solvent is excluded).

One preferred embodiment of the present invention relates to an optical compensatory film comprising an optically anisotropic layer formed of the composition of the present invention. The optical compensatory film of the present invention may comprise single or plural optically anisotropic layers formed of the composition of the present invention. The optical compensatory film may also comprise an optically anisotropic layer formed of a composition other than that of the present invention, or a polymer film.

As described above, the alignment layer or the substrate, which is used for preparation of the optically anisotropic layer, is not necessary.

The optical compensatory film of the present invention may be used in an IPS mode LCD. In such case, an embodiment comprising a first retardation area and a second retardation area; the secodn retardation area being an optically anisotropic layer, formed of a composition comprising, at least, a discotic liquid-crystal compound (desirably discotic liquid-crystal compound), a compound having a fluoro-aliphatic group and a hydrophilic group and an onium salt, in which the molecules of the liquid-crystal compound are aligned vertically; and the first retardation area having a Re of not greater than 20 nm and a Rth of 20 to 150 nm; is preferred.

Figure 2:
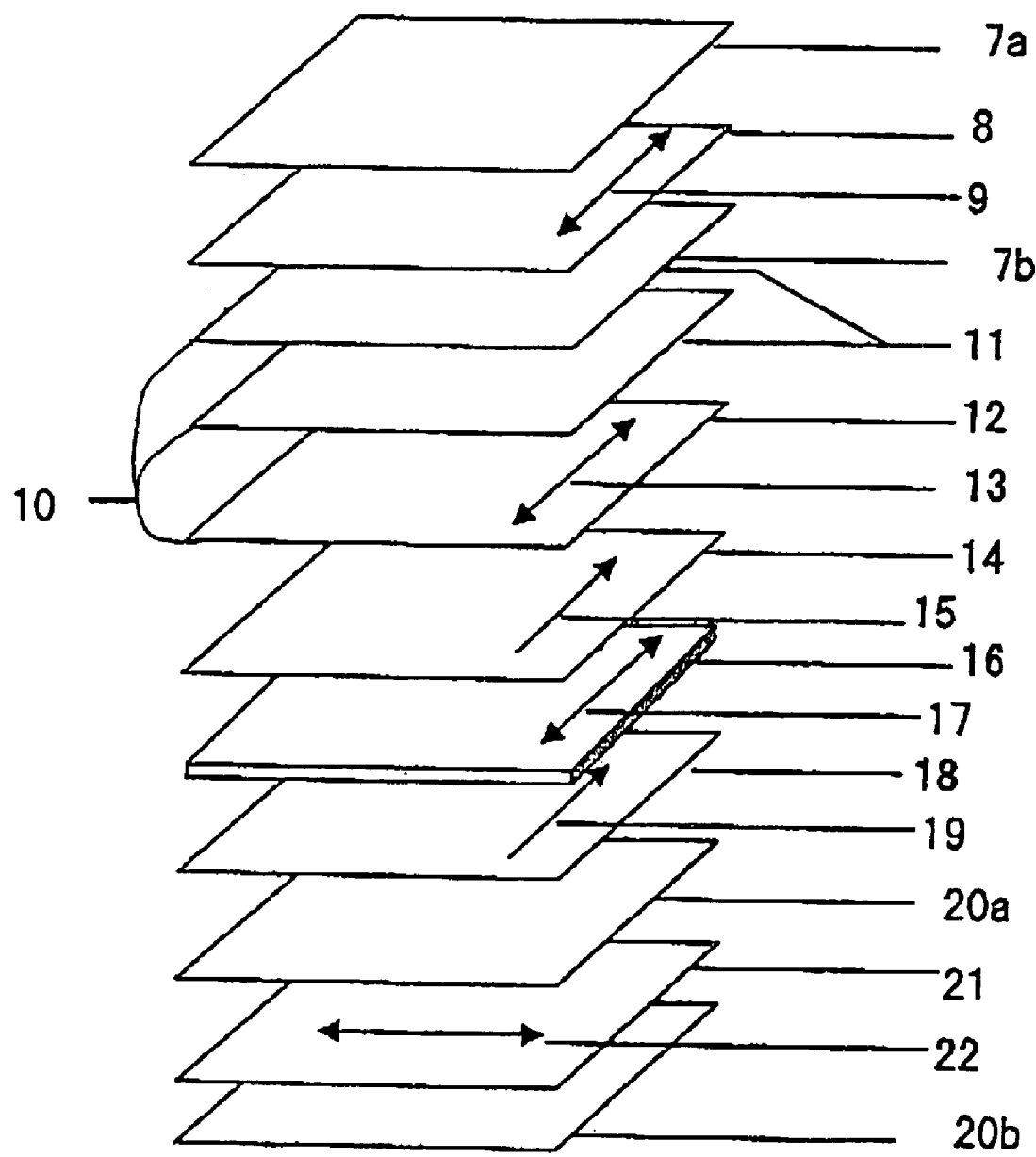
FIG. 2 is a viewing showing a frame format of one embodiment of the liquid-crystal display of the present invention.

Next, one embodiment of an IPS mode liquid-crystal display employing an optically anisotropic layer formed of the composition of the present invention will be described in detail. FIG. 1 is a viewing showing a frame format of an example of a pixel area of the liquid-crystal display of the present invention. FIG. 2 is a viewing showing a frame format of one embodiment of the liquid-crystal display of the present invention.

[Liquid-Crystal Display]

The liquid-crystal display shown in FIG. 2 comprises a first polarizing film 8, an optically anisotropic layer 10, a first substrate 14, a liquid-crystal layer 16, a second substrate 18 and a second polarizing film 21. The first polarizing film 8 and the second polarizing film 21 are sandwiched in between a protective film 7a and 7b and 20a and 20b respectively. The optical compensatory film 10 consists of a first retardation area 11 comprising the protective film 7b contacting the first polarizing film 8, and a second retardation area 12 contacting the first retardation area 12.

The liquid-crystal display shown in FIG. 2, a liquid-crystal cell comprises the first substrate 14 and the second substrate 17 and the liquid-crystal layer 16 sandwiched in between them. For an IPS-mode liquid-crystal cell without twisting structures in a transmission mode, the best value of product ($\Delta n \cdot d$) of a thickness of a liquid-crystal layer, d (μm), and a refractive-index anisotropy, $\Delta n$, is 0.2 to 0.4 μm. When the product is set in the range, the liquid-crystal display, giving a high brightness in a white state and a low brightness in a black state, or, in other words, giving a high contrast and high brightness, can be obtained. Alignment layers (not shown) are formed on the surfaces, contacting the liquid-crystal layer 16, of the substrates 14 and 18, and thus, the liquid-crystal molecules are aligned parallel to the plane of the substrates and their orientations are controlled along with rubbing directions 15 and 19, which are applied to the alignment layers, in the field-free state or in the low-field applied state. And electrodes (not shown in FIG. 2), which can apply the field to liquid-crystal molecules, are formed on the inner surfaces of the substrates 14 and 17.

A viewing showing the orientation of liquid-crystal molecules in a pixel area of the liquid-crystal layer 16 is shown in FIG. 1. FIG. 1 is a viewing showing the orientation of liquid-crystal molecules in an extremely small area corresponding to a pixel area with the rubbing direction 4 applied to the surfaces of the substrates 14 and 18 and electrodes 2 and 3 formed on the inner surfaces of the substrates 14 and 18 to apply the field to liquid-crystal molecules. When nematic liquid crystal, having a positive dielectric-constant anisotropy, is used as a field-effect type liquid crystal and active driving is carried out, the orientations of the liquid-crystal molecules are 5a and 5b in the field-free state or the low-field-applied state, and, then, this state displays black. When the field is applied between the electrodes 2 and 3, the liquid-crystal molecules change the orientations from the directions 5a and 5b to the directions 6a and 6b. Usually, this state displays white.

To return to FIG. 2, the transmission axis 9 of the first polarizing film is perpendicular to the transmission axis 22 of the second polarizing film. The optical compensatory film 10 consists of the first retardation area 11 and the second retardation area 12. The slow axis 13 of the second retardation area is parallel to the transmission axis of the first polarizing film 8 and to the slow axis of the liquid-crystal molecules in the liquid-crystal layer 16 in a black state. And the second retardation area 12 is disposed nearer to the liquid-crystal layer 16 than the first retardation area 11. The second retardation area comprises an optically anisotropic layer formed of a composition of the present invention comprising a discotic liquid-crystal compound, a compound having a fluoro-aliphatic group and a hydrophilic group and an onium salt. In the optically anisotropic layer, the discotic molecules are fixed in a substantially vertical-alignment state to give an optically anisotropy. The two areas of the optical compensatory film will be described in detail later.

In the liquid-crystal display shown in FIG. 2, the first polarizing film is sandwiched in between protective films 7a and 7b, and however, the protective film 7b may be absent. In the embodiment of the present invention comprising the protective film 7b, the protective film 7b is an element of the first retardation area 11. The second polarizing film 21 is also sandwiched in between the protective film 20a and 20b. The protective film 20a, which is disposed nearer to the liquid-crystal layer 16 than another, desirably has a retardation in-thickness direction of not greater than 20 nm.

In FIG. 2, one embodiment employing a transmissive liquid-crystal display comprising upper-side and under-side polarizing plates, is shown, and, however, the present invention includes any embodiments employing a reflective liquid-crystal display comprising one polarizing plate. In such embodiments, the best value of $\Delta n \cdot d$ is about ½ of that described above since the light path is twice as length of that in the embodiment described above.

The configuration of the liquid-crystal display of the present invention is not limited to the embodiment shown in FIG. 1 and FIG. 2, and may further comprise other members. A color filter may be disposed between the liquid-crystal layer and the polarizing film. And an antireflection treatment or a hard coat treatment may be applied to the surface of the protective film of the polarizing film. Conductive members may be used. For the transmissive mode, a back light having a light source such as a cold cathode, a hot cathode fluorescent tube, light-emitting diode, field-emission element or electroluminescent element may be disposed at a back face. A reflective polarizing plate, a prism sheet or an optical waveguide may be also disposed between the liquid-crystal layer and the back-light. The liquid-crystal display of the present invention may be reflective-mode LCD, and in such an embodiment, single polarizing plate may be disposed at viewing side and a reflective film may be disposed a back face or an inner face of the under-side liquid-crystal cell. It is possible to dispose a front light having the light source described above at a viewing side of the liquid-crystal cell.

Embodiments of the present invention include direct types projection types and light modulation types. The embodiments of active-matrix liquid-crystal displays comprising a 3 or 2 terminal semiconductor device such as a TFT or a MIM are especially effective. The embodiments of passive matrix, or, in other words, time-division driving, liquid-crystal displays are effective as well as the above embodiments.

(First Retardation Area of the Optical Compensatory Film)

The in-pale retardation, Re, of the first retardation area is desirably not greater than 20 nm, more desirably not greater than 10 nm and much more desirably not greater than 5 nm. The retardation in a thickness-direction, Rth, of the first retardation area is desirably from 20 to 120 nm, and more desirably from 40 to 100 nm. In the embodiment wherein the protective film 7b, which protects the first polarizing film 8, is optically anisotropic, the protective film 7b is one component of the first retardation area, and, therefore, the Rth of the protective film is added to the Rth of the first retardation area and the total sum of Rth of the all layers of the first retardation area is required to fall within the range from 40 to 100 nm.

In the specification, Re($\lambda$) and Rth($\lambda$) respectively mean an in-plane retardation and a retardation in a thickness-direction at wavelength N. The Re($\lambda$) is measured by using KOBRA-21ADH (manufactured by Oji Scientific Instruments) for an incoming light of a wavelength $\lambda$nm in a direction normal to a film-surface. The Rth($\lambda$) is calculated by using KOBRA-21ADH based on three retardation values; first one of which is the Re($\lambda$) obtained above, second one of which is a retardation which is measured for an incoming light of a wavelength $\lambda$nm in a direction rotated by +40° with respect to the normal direction of the film around an in-plane Slow axis, which is decided by KOBRA 21ADH, as an a tilt axis (a rotation axis), and third one of which is a retardation which is measured for an incoming light of a wavelength $\lambda$nm in a direction rotated by −40° with respect to the normal direction of the film around an in-plane slow axis as an a inclining axis (a rotation axis); a hypothetical mean refractive index and an entered thickness value of the film. The mean refractive indexes of various materials are described in published documents such as "POLYMER HANDBOOK" (JOHN WILEY & SONS, INC) and catalogs. If the values are unknown, the values may be measured with an abbe refractometer or the like. The mean refractive indexes of major optical films are exemplified below:

cellulose acylate (1.48), cyclo-olefin polymer (1.52), polycarbonate (1.59), polymethyl methacrylate (1.49), polystyrene (1.59).

When the hypothetical mean refractive index and a thickness value are put into KOBRA 21ADH, nx, ny and nz are calculated. And Nz, which is equal to (nx-nz)/(nx-ny), is calculated based on the calculated nx, ny and nz.

The retardation film having such optical properties may be selected from birefringent polymer films and retardation films comprising a transparent substrate and an optically an isotropic layer formed of a composition comprising low-molecular weight or high-molecular weight liquid-crystal compound, which is prepared by coating or transferring.

The birefringent polymer films, having such optical properties, can be produced by biaxially drawing polymer films. Some cellulose acylate films, prepared by flow-casting method without drawing, have such optical properties, and they can be used in the present invention desirably. Such cellulose acylate films were described in JPA No. 2002-90541. The polymer films formed of synthesized polymers such as polycarbonates, polysulfones, polyethersulfones, polyacrylates, polymethacrylates, norbornene resins or cellulose acylates may be used.

The retardation layers on a transparent substrate by coating or transferring may be prepared by applying a rod-like cholesteric liquid-crystal composition, having a chiral structural unit, to a substrate, aligning the helical axis vertical to the surface of the substrate, and fixing the molecules in the alignment; by aligning molecules of a discotic liquid-crystal compound having a negative intrinsic birefringence homeotropically (the director being aligned vertically to the substrate surface); or by flow-casting a polyimide on the substrate and fixing.

(Second Retardation Area of the Optically Anisotropic Layer)

According to the present invention, the second retardation area comprises an optically anisotropic layer formed of a composition of the present invention, comprising, at least, a discotic liquid-crystal compound, a fluoride-compound having a fluoro-aliphatic group and a hydrophilic group and an onium salt. In the optically anisotropic layer, the molecules of the discotic liquid-crystal compound are fixed in a vertical-alignment state, and such an alignment gives an optical property. The optical compensatory film was disposed such that the slow axis of the second retardation area is parallel to the transmission axis of the first polarizing film and to the slow axis of the liquid-crystal molecules in the liquid-crystal cell in a black state.

The Re of the second retardation area is desirably from 50 to 200 nm, and more desirably from 80 to 160 nm. The Re may be set in the range by controlling the thickness of the optically anisotropic layer. According to the present invention, it is required that discotic liquid-crystal molecules are substantially aligned vertically to the substrate surface, or in other words aligned with a mean tilt angle of 70 to 90°. When the mean tilt angle is lower than the range, light leakage may diffuse asymmetrically. In the specification, the term of "substantially aligned vertically" means that a mean angle (a mean tilt angle) between a disc-face and a surface of the optically anisotropic layer is from 70 to 90°. These discotic liquid-crystal molecules may be aligned obliquely or aligned such that a tilt angle of the molecules varies along with a distance from the substrate or, in other words, hybrid-aligned For any oblique-alignment or ay hybrid-alignment, the mean tilt angle is desirably from 70 to 90°, more desirably from 75 to 90° and much more desirably from 80 to 90°. As described above, the compound having a fluoro-aliphatic group and an onium salt contribute to aligning discotic liquid-crystal molecules, desirably triphenylene liquid-crystal molecules, in such a vertical alignment state.

The second retardation area may consist of an optically anisotropic layer formed of a composition of the present invention, or may comprise other layers. In the latter embodiment, other layers may be selected from drawn polystyrene films or optically isotropic cyclo-olefin films or the like.

(Protective Film for Second Polarizing Film)

The protective film for the second polarizing film desirably has no absorption in a visible light region, a light transmission of not less than 80%, and a small retardation based on birefringence. In particular, the in-plane retardation, Re, of the protective film is desirably not greater than 20 nm, more desirably not greater than 10 nm, and much more desirably not greater than 5 nm. The retardation in thickness-direction, Rth, of the protective film is desirably not greater than 20 nm, more desirably from 10 nm and much more desirably from not greater than 5 nm. Any films having such optical properties can be used, and, from the viewpoint of durability, cellulose acylate films and norbornene films are preferred. The Rth of a cellulose acylate film can be reduced by mixing liquid-crystal compounds in the film.

(Rod-Like Liquid-Crystal Compound)

The liquid-crystal display of the present invention may comprise a retardation layer formed of a composition comprising a rod-like liquid-crystal compound. As described below, the protective film for the second polarizing film desirably comprises a polymer film, desirably cellulose acylate film, and a retardation layer formed of a composition comprising a rod-like liquid-crystal compound. Preferred examples of the rod-like liquid crystal compound, which can be used in the retardation layer, include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles. Examples of the rod-like liquid crystal compounds further include liquid-crystal polymers.

In the liquid-crystal display, the retardation layer in which rod-like molecules are substantially aligned vertically is desirably used. In the specification, the term of "substantially aligned vertically" for rod-like compounds means that a mean angle (a mean tilt angle) between a director of a rod-like liquid-crystal compound and a surface of the layer is from 70 to 90°. These rod-like liquid-crystal molecules may be aligned obliquely or aligned such that a tilt angle of the molecules varies along with a distance from the substrate or, in other words, hybrid-aligned. For any oblique-alignment or ay hybrid-alignment, the mean tilt angle is desirably from 70 to 90°, more desirably from 75 to 90° and much more desirably from 80 to 90°.

(A Vertical-Alignment Layer)

In order to align the rod-like liquid-crystal molecules vertically at an alignment layer, an alignment layer having a low surface energy should be used. In particular, the functional groups of the polymer in the alignment layer reduce the surface energy of the alignment layer, to align rod-like liquid-crystal molecules vertically. Fluorine atom or hydrocarbon groups having 10 or more carbon atoms are effective as the functional group capable of reducing the surface energy of the alignment layer. A fluorine atom or a hydrocarbon group is preferably introduced into side chain rather than into main chain, for existing them at the surface of the alignment layer. The amount of fluorine atoms included in a fluoride-polymer is desirably from 0.05 to 80 wt %, more desirably from 0.1 to 70 wt %, much more desirably from 0.5 to 65 wt % and further much more desirably from 1 to 60 wt %. The hydrocarbon group is selected from aliphatic groups, aromatic group and any combinations thereof. The aliphatic group may have a cyclic, branched chain or linear chain structure. The aliphatic group is desirably selected from alkyl groups (including cycloalkyl groups) or alkenyl groups (including cycloalkenyl groups). The hydrocarbon group may have a substituent having not so high hydrophilicity such as a halogen atom. The carbon atom number of the hydrocarbon group is desirably from 10 to 100, more desirably from 10 to 60, and much more desirably from 10 to 40. The main chain of the polymer desirably has a polyimide or polyvinyl alcohol structure.

Generally, polyimides are produced by condensation reaction of tetra-carboxylic acids and diamines. Copolymer-like polyimides which are produced by condensation reactions of plural tetra-carboxylic acids and plural diamines may be used. Fluorine atoms or hydrocarbon groups may be included in repeating units derived from tetra-carboxylic acids and/or in repeating units derived from diamines. When hydrocarbon groups are introduced into polyimide, it is preferred that steroid structure is formed in main chain or side chain of the polyimide. The steroid structure existing in side chain corresponds to the hydrocarbon group having 10 or more carbon atoms and contributes to aligning liquid-crystal molecules vertically. In the specification, the term of "steroid structure" is used any cyclopentanone phenanthrene ring structures or any ring structures which can be obtained by replacement of a part of single bonds thereof with double bonds within a replacement range such that the rings are cycloaliphatic or, in other words, the rings don't form aromatic rings.

The rod-like liquid-crystal compounds may be aligned vertically by mixing an organic acid with polymers such as polyvinyl alcohol or polyimide. Examples of the organic acid to be mixed include carboxylic acids, sulfonic acids and amino acids. Among vertical-alignment agents, described below, the agent exhibit acidity may be used. The amount of the organic acid is desirably from 0.1 to 20 wt %, and more desirably from 0.5 to 10 wt % with respect to the weight of polymer.

[Vertical-Alignment at Air-Interface]

Generally, molecules of rod-like liquid-crystal compounds tend to be aligned obliquely at an air-interface side, and, from viewpoint of uniformity of vertical-alignment, the molecules should also be controlled to be aligned vertically at an air-interface. Examples of the vertical-alignment agent at air-interface for rod-like liquid-crystal compounds are same as those for discotic liquid-crystal compounds. And the preferred amount and the preferred scope of the agent for rod-like liquid-crystal compounds were same as those for discotic liquid-crystal compounds respectively. The compounds described in JPA No. 2002-20363 and JPA No. 2002-129162 may be also used as a vertical-alignment agent at air-interface. Those described in the columns [0072] to [0075] of Japanese Patent Application No. 2002-212100, in the columns [0038] to [0040] and [0048] to [0049] of Japanese Patent Application No. 2002-243600, in the columns [0037] to [0039] of Japanese Patent Application No. 2002-262239, and in the columns [0071] to [0078] of Japanese Patent Application No. 2003-91752, are applied to the present invention.

EXAMPLES

The present invention will further be detailed referring to specific Examples. It is to be noted that any materials, reagents, ratios of use thereof and operations shown in the Examples below can properly be modified without departing from the spirit of the present invention. Thus the present invention is by no means limited to the Examples described below, Example 1

<Preparation of an IPS-mode Liquid-Crystal Cell No.1>

An electrode shown in FIG. 1 was formed on a glass plate so that the distance between the electrodes was 20 µm, and a polyimide film was formed on the electrode and subjected to rubbing treatment. The rubbing treatment was carried out in a direction shown in FIG. 1. A polyimide film was formed on another glass plate and subjected to rubbing treatment to form an alignment layer. Two such glass substrates were positioned with their alignment layers facing with their rubbing directions being parallel to each other and with a 3.9 micrometer gap between them. Nematic liquid-crystal composition, having a refractive-index anisotropy, Δn, of 0.0769 and a dielectric-constant anisotropy, Δe, of 4.5, was poured into the gap between the substrates to form a liquid-crystal layer. The d·Δn of the layer was 300 nm.

<Preparation of Optical Compensatory Film No. 1>

(Preparation of First Retardation Area)

The following components were charged to a mixing tank and stirred with heating to prepare a cellulose acetate solution (dope).

| Composition of cellulose acetate solution composition | |
|---|---|
| Cellulose acetate with a 60.9 percent Degree of acetation | 100 weight parts |
| Triphenyl phosphate(plasticizer) | 7.8 weight parts |
| Biphenyldiphenyl phosphate(plasticizer) | 3.9 weight parts |
| Methylene chloride(first solvent) | 300 weight parts |
| Methanol(second solvent) | 54 weight parts |
| 1-Butanol(third solvent) | 11 weight parts |

In another mixing tank, 16 weight parts of the following retardation enhancer, 80 weight parts of methylene chloride and 20 weight parts of methanol were placed, heated under stirring to prepare a retardation enhancer solution. Mixing 487 weight parts of the cellulose acetate solution and 7 weight parts of the retardation enhancer solution under stirring sufficiently, a dope was prepared.

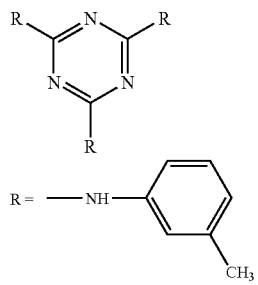

Retardation enhancer

The obtained dope was made to flow to form a film using a band flow-casting machine. After the film temperature was cooled down to 40° C. on the band, the film was dried with hot air of 60° C. for one minute, and then peeled off from the band. Next, the film was dried with dried air of 140° C. for 10 minutes, and thus, Cellulose acetate film No. 1, having a thickness of 80 micrometers, was obtained.

The optical property of the film was obtained by measuring a dependence of Re on an incident angle using an automatic birefringence analyzer ("KOBRA-21ADH" manufactured by Oji Scientific Instruments), and it was found that the film had a Re of 8 nm and a Rth of 82 nm.

(Preparation of Second Retardation Area)

After the surface of Cellulose acetate film No. 1 was saponified, a coating liquid having a formulation shown below was applied to the saponified surface using a wire bar coater in an amount of 20 ml/m$^2$, dried with hot air of 60° C. for 60 seconds and 100° C. for 120 seconds to form a polymer layer. The polymer layer was subjected to rubbing treatment in a parallel direction to a slow axis of the film, and thus, an alignment layer was obtained.

| Formulation of Coating liquid for an alignment layer | |
|---|---|
| Modified polyvinyl alcohol shown below | 10 wt parts |
| Water | 371 wt parts |
| Methanol | 119 wt parts |
| Glutaraldehyde | 0.5 wt parts |
| Modified polyvinyl alcohol | |

$$\mathrm{-(CH_2-CH)_{86.3}(CH_2-CH)_{12}(CH_2-CH)_{1.2}} \quad \mathrm{CH_3}$$
$$\mathrm{\quad\quad | \quad\quad\quad\quad\quad | \quad\quad\quad\quad\quad\quad | \quad\quad\quad\quad\quad |}$$
$$\mathrm{\quad\quad OH \quad\quad\quad\quad OCOCH_3 \quad\quad OCONHCH_2CH_2OCOC=CH_2}$$

A coating solution was prepared by dissolving 1.8 g of a liquid-crystal compound shown below, 0.2 g of Ethylene oxide-modified trimethyrol propane triacrylate (V#360 made by Osaka Organic Chemicals (Ltd.), 0.06 g of a polymerization initiator (IRGACURE 907 manufactured by Ciba-Geigy), 0.02 g of a sensitizer (KAYACURE-DETX manufactured by NIPPON KAYAKU CO., LTD.), 0.0072 g of a vertical alignment agent at an air-interface (Fluoride-polymer No. P-15) and 0.009 g of a vertical alignment agent at an alignment-layer interface (Onium salt No. II-23) in 3.9 g of methyl ethyl ketone, and the coating solution was applied to the surface of the alignment layer with a #3.4 wire-bar. After being attached to a metal frame, the coating layer was heated in a constant-temperature bath of 125° C. for 3 minutes to align the discotic molecules. Subsequently, the layer was irradiated at 100° C. with UV light using a 120 w/cm high-pressurized mercury lamp for 30 seconds to crosslink the discotic molecules, and then, an optically anisotropic layer was formed. After that, cooled down the room temperature, and then Optical compensatory film No. 1 was obtained.

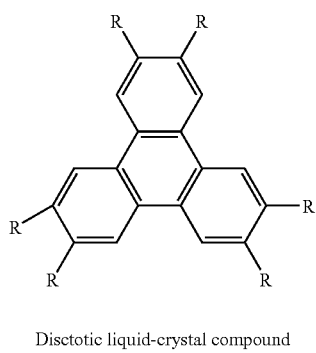

Disctotic liquid-crystal compound

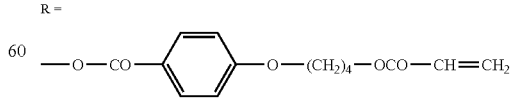

Optical properties of Optical compensatory film No. 2 were measured according to the above described method. And subtracting the portion contributed by cellulose acrylate film, which was measured previously, the optical properties of only the retardation layer formed of discotic molecules were calculated. It was found that the Re of the retardation layer was 130 nm, the Rth of the retardation layer was −65 nm, the mean tilt angle of liquid-crystal molecules in the retardation layer was 89.9° and discotic molecules in the retardation layer were vertical to a film-surface. It was also found that the slow axis was parallel to the rubbing direction of the alignment layer.

<Tilt Angles in Areas Near to an Air-Interface and to an Alignment-Layer Interface>

The tilt angles of liquid-crystalline molecules in the optically anisotropic layer at an alignment layer interface and at an air interface were calculated using an ellipsometer (APE-100 manufactured by SHIMADZU CORPORATION), according to the above described method. It was found that the tilt angle in area near to the air-interface was 89.9°, and the tilt angle in an area near to an alignment layer interface was 89.9°.

Iodine was adsorbed onto a stretched polyvinyl alcohol film to prepare a polarizing film. One side of the polarizing film was bonded with a polyvinyl alcohol-based adhesive to the transparent support surface of Optical compensatory film No. 1 in the manner such that Cellulose acetate film No.1 was disposed nearer to the polarizing film. The transmission axis of the polarizing film was positioned parallel to the slow axis of the optical compensatory film (equal to the slow axis of the second retardation area). A commercially available cellulose acylate film ("FUJITAC TD80UF" manufactured by FUJI PHOTO FILM CO., LTD.) was saponified and was bonded to the opposite surface of the polarizing film with polyvinyl alcohol-based adhesive. The obtained polarizing plate was bonded to one side of an IPS liquid-crystal cell No.1 prepared as set forth above so that the optically anisotropic surface faced the substrates of the liquid-crystal cell. The slow axis of Optical compensatory film No.1 was made parallel to the rubbing direction of the alignment layer of the liquid-crystal cell, or in other words, the slow axis of the second retardation area was parallel to the slow axis of the liquid-crystal cell in a black state. A commercially available polarizing plate ("HLC2-5618" manufactured by SANRITZ CORPORATION) was bonded to another side of the cell in a cross-nicole alignment. Thus, a liquid-crystal display was produced.

<Measurement of Light Leakage from the LCD>

Light leakage from the LCD was measured. Observed from a distance in a leftward 70° oblique direction, it was found that light leakage was 0.12%.

Example No. 2

<Preparation of Optical Compensatory Film No. 2>

A commercially available cellulose acetate film ("FUJITAC TD80UF" manufactured by FUJI PHOTO FILM CO., LTD.), having a Re of 3 nm and a Rth of 45 nm, was used as a first retardation area. The film was saponified, and the coating liquid for an alignment layer, prepared in the same manner of Examples 1, was applied to the saponified surface with a wire-bar coater in an amount of 20 ml/m², dried with hot air of 60° C. for 60 seconds, and subsequently dried with hot air of 100° C. for 120 seconds to form a polymer layer. Next, the polymer layer was subjected to rubbing treatment in a direction parallel to the slow axis of the film to form an alignment layer.

Subsequently, a coating solution was prepared in the same manner of Example 1, or in other words prepared by dissolving 1.8 g of a liquid-crystal compound shown above, 0.2 g of ethylene oxide-modified trimethyrol propane triacrylate (V#360 made by Osaka Organic Chemicals (Ltd.), 0.06 g of a polymerization initiator (IRGACURE 907 manufactured by Ciba-Geigy), 0.02 g of a sensitizer (KAYACURE-DETX manufactured by NIPPON KAYAKU CO., LTD.), 0.0036 g of a vertical alignment agent at an air-interface (Fluoride-polymer No. I-48) and 0.009 g of a vertical alignment agent at an alignment-layer interface (Onium salt No. II-23) in 3.9 g of methyl ethyl ketone, and the coating solution was applied to the surface of the alignment layer with a #3 wire-bar. After being attached to a metal frame, the coating layer was heated in a constant-temperature bath of 125° C. for 3 minutes to align the discotic molecules. Subsequently, the layer was irradiated at 100° C. with UV light using a 120 w/cm high-pressurized mercury lamp for 30 seconds to crosslink the discotic molecules, and then, an optically anisotropic layer was formed. After that, cooled down the room temperature, and then Optical compensatory film No. 2 was obtained.

Optical properties of Optical compensatory film No. 2 were measured according to the above described method. And subtracting the portion contributed by cellulose acrylate film, which was measured previously, the optical properties of only the retardation layer formed of discotic molecules were calculated. It was found that the Re of the retardation layer was 115 nm, the Rth of the retardation layer was −57 nm, the mean tilt angle of liquid-crystal molecules in the retardation layer was 89.9° and discotic molecules in the retardation layer were vertical to a film-surface. It was also found that the slow axis was parallel to the rubbing direction of the alignment layer.

<Tilt Angles in Areas Near to an Air-Interface and to an Alignment-Layer Interface>

The tilt angles of liquid-crystalline molecules in the optically anisotropic layer at an alignment layer interface and at an air interface were calculated using an ellipsometer (APE-100 manufactured by SHIMADZU CORPORATION), according to the above described method. It was found that the tilt angle in area near to the air-interface was 89.9°, and the tilt angle in an area near to an alignment layer interface was 89.9°.

Optical compensatory film No. 2 was bonded to one side of an IPS-mode liquid-crystal cell No.1 prepared as set forth above so that the optically anisotropic surface faced the substrates of the liquid-crystal cell. The slow axis of Optical compensatory film No.2 was made parallel to the rubbing direction of the alignment layer of the liquid-crystal cell, or in other words, the slow axis of the second retardation area was parallel to the slow axis of the liquid-crystal cell in a black state. Subsequently, a commercially available polarizing plate ("HLC2-5618" manufactured by SANRITZ COROPORATION) was bonded to Optical compensatory film No.2 so that the transmissive axis of the polarizing plate was parallel to the rubbing direction of the liquid-crystal cell, and a commercially available polarizing plate ("HLC2-5618" manufactured by SANRITZ CORPORATION) was bonded to another side of the cell in a cross-nicole alignment. Thus, a liquid-crystal display was produced.

<Measurement of Light Leakage from the LCD>

Light leakage from the LCD was measured, Observed from a distance in a leftward 70° oblique direction, it was found that light leakage was 0.13%.

Example 3

<Preparation of Second Polarizing Plate No. 1>

A commercially available cellulose acetate film ("FUJI-TAC TD80UF" manufactured by FUJI PHOTO FILM CO., LTD.), having a Re of 3 nm and a Rth of 45 nm, was saponified, and a coating liquid, which was prepared by diluting a commercially available vertical alignment layer ("JALS-204R" manufactured by JSR Corporation) with methyl ethyl ketone in a ratio of 1:1, was applied to a saponified surface of the cellulose acetate film with a wire-bar coater in an amount of 2.4 ml/m$^2$; and immediately, dried with hot air of 120° C. for 120 seconds.

(Preparation a Layer in Which Rod-Like Liquid-Crystal Molecules are Aligned Vertically)

A coating solution was prepared by dissolving 1.8 g of a liquid-crystal compound shown below, 0.06 g of a polymerization initiator (IRGACURE 907 manufactured by Ciba-Geigy), 0.02 g of a sensitizer (KAYACURE-DETX manufactured by NIPPON KAYAKU CO., LTD.) and 0.002 g of a vertical alignment agent at an air-interface sown below in 9.2 g of methyl ethyl ketone, and the coating solution was applied to the surface of the alignment layer with a #2 wire-bar. After being attached to a metal frame, the coating layer was heated in a constant-temperature bath of 100° C. for 2 minutes to align the rod-like molecules. Subsequently, the layer was irradiated at 100° C. with UV light using a 120 w/cm high-pressurized mercury lamp for 30 seconds to crosslink the rod-like molecules. After that, cooled down the room temperature, and then Protective film No.1 for Second polarizing plate was obtained.

Rod-like liquid-crystal compound

Vertical alignment agent at air-interface:

Compound No. I-4 exemplified in the specification of Japanese patent application No. 2003-119959

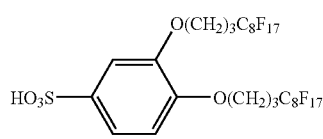

The optical property of Protective film 1 was obtained by measuring a dependence of Re on an incident angle using an automatic birefringence analyzer ("KOBRA-21ADH" manufactured by Oji Scientific Instruments), and it was found that Protective film had a Re of 3 nm and a Rth of 5 nm.

Iodine was adsorbed onto a stretched polyvinyl alcohol film to prepare a polarizing film. One side of the polarizing film was bonded with a polyvinyl alcohol-based adhesive to the transparent support surface of Protective film No.1 in the manner such that the cellulose acetate film was disposed nearer to the polarizing film. A commercially available cellulose acylate film ("FUJITAC TD80UF" manufactured by FUJI PHOTO FILM CO., LTD.) was saponified and was bonded to the opposite surface of the polarizing film with polyvinyl alcohol-based adhesive. Thus, Second polarizing plate was prepared. As in the manner of Example 1, one side of the polarizing film was bonded with a polyvinyl alcohol-based adhesive to the transparent support surface of Optical compensatory film No. 1; and a commercially available cellulose acylate film ("FUJITAC TD80UF" manufactured by FUJI PHOTO FILM CO., LTD.) was saponified and was bonded to the opposite surface of the polarizing film with polyvinyl alcohol-based adhesive. Thus, Polarizing plate No. 1 was obtained. The obtained Polarizing plate No.1 was bonded to one side of the IPS liquid-crystal cell prepared as set forth above so that the optically anisotropic surface faced the substrates of the liquid-crystal cell. The slow axis of Optical compensatory film No.1 was made parallel to the rubbing direction of the alignment layer of the liquid-crystal cell, or in other words, the slow axis of the second retardation area was parallel to the slow axis of the liquid-crystal cell in a black state. Polarizing plate No.2 was bonded to another side of the cell so that the transmission axis of the polarizing film was perpendicular to the rubbing direction of the liquid-crystal cell and Protective film No. 1 faced the substrates of the liquid-crystal cell. Thus, a liquid-crystal display was produced.

<Measurement of Light Leakage from the LCD>

Light leakage from the LCD was measured. Observed from a distance in a leftward 70° oblique direction, it was found that light leakage was 0.03%.

Comparative Example 1

Two commerically available poralizieng plates ("HLC2-5618" manufactured by SANRITZ CORPORATION) were bonded both sides of a IPS mode liquid-crystal cell, prepared in the same manner of Example 1, so that two were positioned in a cross-nicole alignment. Thus, a liquid-crystal display was produced. No optical compensatory film was used. As in the manner of Example 1, the upside polarizing plate was bonded so that the transmission axis was parallel to the rubbing direction of the cell.

Light leakage was measured in the same manner of Example 1. Observed from a distance in a leftward 70° oblique direction, it was found that light leakage was 0.55%.

Comparative Example 2

Optical compensatory film No. 2 was bonded to an IPS-mode liquid-crystal cell, prepared in the same-manner of Example 1, so that the slow axis of Optical compensatory film No. 2 was perpendicular to the rubbing direction of the cell, and the optically anisotropic layer surface faced the substrates of the cell. A commercially available polarizing plate ("HLC2-5618" manufactured by SANRITZ CORPORATION) was bonded to Optical compensatory film No.2 so that the transmission axis of the polarizing plate was parallel to the rubbing direction of the cell. A commercially available polarizing plate ("HLC2-5618" manufactured by SANRITZ CORPORATION) was bonded to another side of the IPS-mode cell in a cross-nicole alignment. Ths, a liquid-crystal display was produced.

Light leakage was measured in the same manner of Example 1. Observed from a distance in a leftward 70° oblique direction, it was found that light leakage was 1.52%.

Comparative Example 3

A liquid-crystal display was produced in the same manner of Example 1, except that a vertical alignment agent at air-interface (Fluoride-polymer P-15) was not used in the coating solution for preparing the optically anisotropic layer. And light leakage was measured in the same manner of Example 1. Observed from a distance in a leftward 70° oblique direction, it was found that light leakage was 1.2%.

Comparative Example 4

A liquid-crystal display was produced in the same manner of Example 1, except that a vertical alignment agent at alignment-layer-interface (Onium salt II-23) was not used in the coating solution for preparing the optically anisotropic layer. And light leakage was measured in the same manner of Example 1. Observed from a distance in a leftward 70° oblique direction, it was found that light leakage was 0.50%.

<Tilt Angles in Areas Near to an Air-Interface and to an Alignment-Layer Interface>

The tilt angles of liquid-crystalline molecules in the optically anisotropic layer at an alignment layer interface and at an air interface were calculated using an ellipsometer (APE-100 manufactured by SHIMADZU CORPORATION), according to the above described method. It was found that the tilt angle in area near to the air-interface was 6.4°, and the tilt angle in an area near to an alignment layer interface was 85.4°.

Comparative Example 5

A liquid-crystal display was produced in the same manner of Example 2, except that both of vertical alignment agents at air-interface (Fluoride compound I-48) and at alignment-layer-interface (Onium salt II-23) were not used in the coating solution for preparing the optically anisotropic layer. And light leakage was measured in the same manner of Example 1. Observed from a distance in a leftward 70° oblique direction, it was found that light leakage was 0.51%.

<Tilt Angles in Areas Near to an Air-Interface and to an Alignment-Layer Interface>

The tilt angles of liquid-crystalline molecules in the optically anisotropic layer at an alignment layer interface and at an air interface were calculated using an ellipsometer (APE-100 manufactured by SHIMADZU CORPORATION), according to the above described method. It was found that the tilt angle in area near to the air-interface was 6.4°, and the tilt angle in an area near to an alignment layer interface was 46.0°.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An optical compensatory film comprising at least one optically anisotropic layer formed of a composition comprising:
   at least one compound having a fluoro-aliphatic group and at least one hydrophilic group selected from the group consisting of a carboxyl group (—COOH), a sulfo group (—SO$_3$H), a sulfato group (—OSO$_3$H), a phosphonoxy group {—OP(=O)(OH)$_2$} and salts thereof;
   at least one onium salt; and
   at least one liquid-crystal compound;
   wherein the compound having a fluoro-aliphatic group and at least one hydrophilic group is a compound represented by Formula (2b):

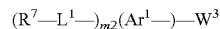

$R^7$ represents an alkyl group, an alkyl group having a terminal CF$_3$ group or an alkyl group having a terminal CF$_2$H group; m2 denotes an integer greater than or equal to 1, wherein multiple occurrences of $R^7$ may be identical or different, with at least one representing an alkyl group having a terminal CF$_3$ group or a terminal CHF$_2$ group; $L^1$ represents a divalent linking group selected from the group consisting of an alkylene group, an aromatic group, —CO—, —NR— wherein R denotes a C$_{1-5}$ alkyl group or a hydrogen atom, —O—, —S—, —SO—, —SO$_2$— and any combination thereof, where multiple occurrences of $L^1$ may be identical or different; $Ar^1$ represents an aromatic carbon ring residue or an aromatic hetero ring residue; and $W^3$ represents a carboxyl group (—COOH) or a salt thereof, a sulfo group (—SO$_3$H) or a salt thereof, a sulfato group (—OSO$_3$H) or a salt thereof, or a phosphonoxy group {—OP(=O)(OH)$_2$} or a salt thereof;
   the onium salt is a quaternary ammonium salt; and
   the liquid-crystal compound is a discotic compound and molecules of the discotic compound are substantially aligned vertically in the optically anisotropic layer.

2. An optical compensatory film comprising at least one optically anisotropic layer formed of a composition comprising:
   at least one compound having a fluoro-aliphatic group and at least one hydrophilic group selected from the group consisting of a carboxyl group (—COOH), a sulfo group (—SO$_3$H), a sulfato group (—OSO$_3$H), a phosphonoxy group {—OP(=O)(OH)$_2$} and salts thereof;
   at least one onium salt; and
   at least one liquid-crystal compound;
   wherein the compound having a fluoro-aliphatic group is a copolymer comprising a repeating unit derived from a monomer having a fluoro-aliphatic group and a repeating unit represented by Formula (1):

Formula (1)

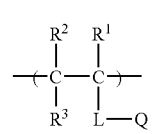

wherein $R^1$, $R^2$ and $R^3$ respectively represent a hydrogen atom or a substituent; L represents a divalent linking group selected from the Linking Group shown below or a divalent linking group consisting of two or more selected from the Linking Group shown below;

(Linking Group)

a single bond, —O—, —CO—, —$NR^4$— where $R^4$ represents a hydrogen atom, an alkyl group, an aryl group or an aralkyl group, —S—, —$SO_2$—, —P(=O)($OR^5$)— where $R^5$ represents an alkyl group, an aryl group or an aralkyl group, an alkylene group and arylene group;

Q represents a carboxyl group (—COOH) or a salt thereof, a sulfo group (—$SO_3H$) or a salt thereof, a sulfato group (—$OSO_3H$) or a salt thereof, or a phosphonoxy group {—OP(=O)(OH)$_2$}or a salt thereof;

the onium salt is a quaternary ammonium salt; and the liquid-crystal compound is a discotic compound and molecules of the discotic compound are substantially aligned vertically in the optically anisotropic layer.

3. A liquid crystal display comprising, in this order:
a first polarizing film,
an optical compensatory film comprising a first retardation-area contacting with the first polarizing film and a second retardation-area contacting with the first retardation-area, and
a liquid-crystal cell comprising a pair of a first and a second substrates and a liquid crystal layer formed of a nematic liquid-crystal material sandwiched in between the pair of the substrates, and molecules of the nematic liquid-crystal being parallel to surfaces of the pair of substrates in a black state;
wherein the first retardation-area has an in-plane retardation value, Re, of not greater than 20 nm; and a retardation value in thickness direction, Rth, falling with in a range from 20 to 120 nm;
the second retardation area comprises an optically anisotropic layer which is formed of a composition comprising at least one compound having a fluoro-aliphatic group and at least one hydrophilic group selected from the group consisting of a carboxyl group (—COOH), a sulfo group (—$SO_3H$), a sulfato group (—$OSO_3H$), a phosphonoxy group {—OP(=O)(OH)$_2$} and salts thereof; at least one onium salt; and at least one discotic liquid-crystal compound; and in which molecules of the discotic liquid-crystal compound being substantially aligned vertically; and
a slow axis of the second retardation-area is parallel to both of a transmission axis of the first polarizing film and a slow axis of the liquid crystal layer in a black state.

4. The liquid crystal display of claim 3, comprising a second polarizing film disposed outside of the second substrate.

5. The liquid crystal display of claim 3, wherein the second retardation-area has Re falling with in a range from 50 to 200 nm.

6. The liquid crystal display of claim 3, wherein the first retardation-area comprises plural layers and one layer of the plural layers contacting with the second retardation-area is an alignment layer.

7. The liquid crystal display of claim 3, comprising a pair of protective layers sandwiching the second retardation-area, wherein one of the protective layers disposed nearer to the liquid-crystal layer than another has Rth not greater than 20 nm.

8. The liquid crystal display of claim 3, comprising a pair of protective layers sandwiching the second retardation-area, wherein one of the protective layers disposed nearer to the liquid-crystal layer than another is a cellulose acylate film or a norbornene or norbornene-derivative film.

9. The liquid crystal display of claim 3, comprising a pair of protective layers sandwiching the second retardation-area, wherein one of the protective layers disposed nearer to the liquid-crystal layer than another comprises a cellulose acylate film and a layer comprising a rod-like liquid-crystal compound aligned vertically.

10. The liquid crystal display of claim 3, wherein the first retardation-area comprises plural layers and one layer of the plural layers contacting with the first polarizing film is capable of being a protective layer of the first polarizing film.

* * * * *